(12) United States Patent
Worrall

(10) Patent No.: US 8,976,714 B2
(45) Date of Patent: Mar. 10, 2015

(54) PROVIDING AND ACQUIRING A SYSTEM INFORMATION MESSAGE IN A WIRELESS NETWORK

(75) Inventor: Chandrika Worrall, Newbury (GB)

(73) Assignee: Intellectual Ventures Holding 81 LLC, Las Vegas, NV (US)

( * ) Notice: Subject to any disclaimer, the term of this patent is extended or adjusted under 35 U.S.C. 154(b) by 439 days.

(21) Appl. No.: 13/133,076

(22) PCT Filed: Dec. 9, 2009

(86) PCT No.: PCT/EP2009/008798
§ 371 (c)(1),
(2), (4) Date: Nov. 15, 2011

(87) PCT Pub. No.: WO2010/066413
PCT Pub. Date: Jun. 17, 2010

(65) Prior Publication Data
US 2012/0063370 A1    Mar. 15, 2012

(30) Foreign Application Priority Data
Dec. 9, 2008  (GB) .................................. 0822408.1

(51) Int. Cl.
*H04J 3/00*    (2006.01)
*H04W 48/12*   (2009.01)
*H04W 74/00*   (2009.01)
*H04L 1/08*    (2006.01)

(52) U.S. Cl.
CPC .................. *H04W 48/12* (2013.01); *H04L 1/08* (2013.01); *H04W 74/006* (2013.01)

USPC ........... 370/280; 370/329; 370/328; 370/350; 370/252; 370/235; 715/733

(58) Field of Classification Search
USPC .................. 370/280, 329, 328, 350; 715/733
See application file for complete search history.

(56) References Cited

U.S. PATENT DOCUMENTS

| | | |
|---|---|---|
| 8,203,988 B2 * | 6/2012 | Chun et al. ..................... 370/312 |
| 2008/0219190 A1 * | 9/2008 | Haartsen ........................ 370/280 |
| 2009/0319903 A1 * | 12/2009 | Alanara ........................ 715/733 |
| 2010/0172299 A1 * | 7/2010 | Fischer et al. ................ 370/328 |

(Continued)

FOREIGN PATENT DOCUMENTS

| | | |
|---|---|---|
| WO | 2008111014 | 9/2008 |
| WO | 2008156412 | 12/2008 |

OTHER PUBLICATIONS

"3rd Generation Partnership Project, Technical Specification Group Radio Access Network, Evolved Universal Terrestrial Radio Access (E-UTRA) Radio Resource Control (RRC) Protocol Specification (Release 8); 3GPP TS 36.331 V8.4.0, Dec. 1, 2008; vol. 36.331, Nr: V8.4.0, pp. 1-198".*

(Continued)

*Primary Examiner* — Faruk Hamza
*Assistant Examiner* — Shah R Zaman
(74) *Attorney, Agent, or Firm* — Volpe and Koenig, P.C.

(57) ABSTRACT

Receiving a system information (SI) message is disclosed. A user equipment (UE) may be configured to receive si-Windowlength information in a SI type 1 message. The UE may determine a downlink (DL) subframe wherein a SI message starts based on a number of DL subframes contained in a radio frame. The UE may be configured to receive the SI message in a DL subframe of a calculated radio frame.

15 Claims, 24 Drawing Sheets

(56) References Cited

U.S. PATENT DOCUMENTS

| | | | | |
|---|---|---|---|---|
| 2010/0246504 A1* | 9/2010 | Kim et al. | ...................... | 370/329 |
| 2011/0164584 A1* | 7/2011 | Seo et al. | ...................... | 370/329 |

OTHER PUBLICATIONS

3GPP TS 36.211 V8.4.0. 3rd Generation Partnership Project; Technical Specification Group Radio Access Network; Evolved Universal Terrestrial Radio Access (E-UTRA); Physical Channels and Modulation (Release 8) 3rd Generation Partnership Project (3GPP); Technicalspecification (TS), Nov. 2008.*

Holma et al., "WCDMA for UMTS: Radio Access for Third Generation Mobile Communications," Introduction, John Wiley & Sons, Ltd. (2001).

Third Generation Partnership Project, "Technical Specification Group Radio Access Network; Evolved Universal Terrestrial Radio Access (E-UTRA); Physical layer procedures (Release 8)," 3GPP TS 36.213 V8.4.0 (Sep. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.6.0 (Sep. 2008).

3GPP TS 36.331 V8.4.0 (Dec. 2008) 3rd Generation Partnership Project; Technical Specification Group Radio Access Network; Evolved Universal Terrestrial Radio Access (E-UTRA) Radio Resource Control (RRC); Protocol Specification (Release 8), (Dec. 1, 2008), XP002579528.

3GPP TS 36.211 V8.5.0 (Dec. 2008) 3rd Generation Partnership Project; Technical Specification Group Radio Access Network; Evolved Universal Terrestrial Radio Access (E-UTRA); Physical Channels and Modulation (Release 8), (Dec. 1, 2008), XP007912814.

TSG-RAN2 #58bis, Orlando, FL, US, Jun. 25-29, 2007, Ericsson, Transmission of Dynamic System Information, 4.9, Discussion and Decision, R2-072543.

3GPP TSG-RAN2 Meeting #59, Athens, Greece, Aug. 20-24, 2007, 5.3.1, Ericsson, Transmission of Dynamic System Information, Discussion and Decision, Tdoc R2-073236.

3Gpp TSG-RAN2 Ad-hoc Meeting, Venna, Austria, Dec. 13-14, 2007, 3.3, Ericsson, Transmission of Dynamic System Information, Discussion and Decision, Tdoc R2-075559.

3GPP TSG RAN WG1 #54bis Meeting Prague, Czech Republic, Sep. 29-Oct. 3, 2008, Nokia Siemens Networks, Nokia, Implicit RV Determination for BCCH, Agenda Item 6.2, Discussion and Decision, R1-083717.

3GPP TSG Ran WG2 Meeting #64, Prague, Czech Republic, Nov. 10-14, 2008, 6.1.1.3, CATT, RV Determination for BCCH, Discussion and Decision, R2-086986.

3GPP TS36.331 V8.1.0 (Mar. 2008), 3rd Generation Partnership Project; Technical Specification Group Radio Access Network; Evolved Universal Terrestrial Radio Access (E-UTRA) Radio Resource Control (RRC); Protocol spec. (Release 8). Accessed Dec. 3, 2009.

3GPP TS36.331 V8.2.0 (May 2008), 3rd Generation Partnership Project; Technical Specification Group Radio Access Network; Evolved Universal Terrestrial Radio Access Network; Evolved Universal Terrestrial Radio Access (E-UTRA) Radio Resource Control (RRC); Protocol spec. (Release 8). Accessed Dec. 3, 2009.

PCT International Search Report dated and Written Opinion issued on Dec. 5, 2010 in PCT/EP09/008798.

Combined Search and Examination Report by GB Intellectual Property Office issued on Mar. 13, 2009 in GB0822408.1.

* cited by examiner

PROVIDING AND ACQUIRING A SYSTEM INFORMATION MESSAGE IN A WIRELESS NETWORK

CROSS REFERENCE TO RELATED APPLICATIONS

This application is a national phase application of International Application No. PCT/EP2009/008798, filed Dec. 9, 2009, claiming priority to Great Britain Application No. 0822408.1, filed Dec. 9, 2008, both of which are incorporated by reference herein in their entirety.

FIELD OF THE INVENTION

The invention relates to acquiring a system information message in a wireless communication system, and in particular, but not exclusively, to apparatus and a method for acquisition of a system information Messages in a long term evolution (LTE) time-division duplex (TDD) $3^{rd}$ Generation Partnership Project (3GPP) cellular communication system.

BACKGROUND OF THE INVENTION

Currently, 3rd generation cellular communication systems are being rolled out to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. This is in contrast to time division multiple access (TDMA) systems, where user separation is achieved by assigning different time slots to different users.

In addition, TDD provides for the same carrier frequency to be used for both uplink transmissions, i.e. transmissions from the mobile wireless communication unit (often referred to as wireless subscriber communication unit) to the communication infrastructure via a wireless serving base station and downlink transmissions, i.e. transmissions from the communication infrastructure to the mobile wireless communication unit via a serving base station. In TDD, the carrier frequency is subdivided in the time domain into a series of timeslots. The single carrier frequency is assigned to uplink transmissions during some timeslots and to downlink transmissions during other timeslots. An example of a communication system using this principle is the Universal Mobile Telecommunication System (UMTS). Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

The Long Term Evolution (LTE) is a new terrestrial mobile communication standard currently being standardised by the 3GPP and is expected to be completed in the 2009/2010 timeframe. The Radio Access Network (RAN) of LTE is named as the Evolved-Universal Mobile Telecommunication Systems Radio Access Network (E-UTRAN). The E-UTRAN physical layer is based on Orthogonal Frequency Division Multiplexing (OFDM). More precisely; the downlink transmission scheme is based on conventional OFDM using a cyclic prefix while the uplink transmission is based on single-carrier frequency division multiple access (FDMA) techniques, more specifically DFTS-OFDM. The OFDM sub-carrier spacing is $\Delta f=15$ kHz in both uplink and downlink transmission. LTE supports both frequency division duplex (FDD) and time division duplex (TDD). More information on E-UTRAN standard can be found in TS 36.XXXX series of 3GPP document at: ftp://ftp.3gpp.org/Specs/latest/Rel-8/36_series/.

System Information (SI) in an LTE system is divided into a number of SystemInformationBlocks and MasterInformationBlock (MIB). The MIB includes a limited number of most essential and frequently transmitted parameters to acquire other information from the cell. SI is defined in [TS 36.300] as a RRC message carrying a number of SystemInformationBlocks that have the same periodicity. Each SystemInformationBlock contains a set of related system information parameters.

SystemInformationBlockType1 is transmitted alone, separately from other SI-messages. The MIB message is mapped on the Broadcast Control CHannel (BCCH) and carried on a Broadcast Channel (BCH). All other SI messages are mapped on the BCCH and carried on a DownLink Shared Channel (DL-SCH) where they can be identified through the SI-RNTI (System Information RNTI).

Also, SystemInformationBlocks other than SystemInformationBlocksType1 are carried in SI messages and mapping of SystemInformationBlocks to SI messages is flexibly configurable by using a schedulingInformation parameter included in SystemInformationBlocksType1, with restrictions that each SystemInformationBlock is contained only in a single SI message. Only SystemInformationBlocks having the same scheduling (periodicity) requirement can be mapped to the same SI message. SystemInformationBlocksType2 is always mapped to the SI message that corresponds to the first entry in the list of SI messages in the schedulingInformation parameter.

It is known that there may be multiple SI messages transmitted with the same periodicity. SystemInformationBlocksType1 and all SI messages are transmitted on DL-SCH.

The MIB uses a fixed schedule with a periodicity of 40 msec and repetitions made within 40 ms. The first transmission of the MIB is scheduled in subframe #0 of radio frames for which the SFN mod 4=0, and repetitions are scheduled in subframe #0 of all other radio frames. The SystemInformationBlockType1 uses a fixed schedule with a periodicity of 80 msec and repetitions made within 80 msec.

It is known that the first transmission of SystemInformationBlockType1 is scheduled in subframe #5 of radio frames for which the SFN mod 8=0, and repetitions are scheduled in subframe #5 of all other radio frames for which SFN mod 2=0.

The SI messages are transmitted within periodically occurring time domain windows (referred to as SI-windows) using a dynamic scheduling mechanism. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than subframes where SystemInformationBlockType1 is present (i.e. subframe #5 of radio frames for which SFN mod 2=0) amongst others.

SystemInformationBlockType1 configures the SI-window length and the transmission periodicity for the SI messages. A user equipment (UE) acquires the detailed time-domain scheduling (and other information, e.g. frequency-domain scheduling, information on the used transport format, etc.) from decoding the SI-RNTI on Physical Dedicated Control CHannel (PDCCH). A single SI-RNTI is used to address SystemInformationBlockType1 as well as other SI messages.

The UE acquires the system information upon selecting (e.g. upon power on) and upon re-selecting a cell, after handover completion, after entering E-UTRA from another radio access technology (RAT), upon return from an out-of-coverage area, upon receiving a notification that the system information has changed or upon exceeding the maximum validity duration of system information.

It is also known that the technical specification 'TS 36.331' specifies the system information acquisition procedure. A common procedure is defined for both frequency division duplex (FDD) and time division duplex (TDD) networks, with a common value range of SI-window length. The common procedure is defined to guarantee that SI-windows do not overlap in time, and that SI-windows are consecutive in the time domain. However, the calculation of SI-window and the starting point of each SI-window do not take into account the frame configuration (for example the downlink (DL)/uplink (UL) split) in a TDD network. As a consequence, the delivery of system information in TDD network is not possible with some of the configurations allowed in the standard.

Referring now to FIG. 1, the current LTE standard in TS 36.331 specifies the following procedure to determine the start of the SI-window for a particular SI message. For the concerned SI message, the known process commences with a determination of the number n, which corresponds to the order of entry in the list of SI messages. The list of SI messages is configured by schedulingInformation signalled in SystemInformationBlockType1, as shown in step 105. The known process then continues with a determination of the integer value x, in step 110, where:

$$x=(n-1)*w,$$

where w is the si-WindowLength. The value of SI-WindowLength is then signalled to the UE in SystemInformationBlockType1, as shown in step 115. One si-WindowLength is used for all the System Information Messages (SIs) configured in SystemInformationBlockType1.

The known process then calculates the respective subframe number within a radio frame, for example subframe #a, as shown in step 120, such that a=x mod 10. Subframe #a is the subframe which the SI-window for the concerned SI message is started. The known process then determines the radio frame of the single frequency network (SFN), as shown in step 120 such that:

$$\text{mod } T = \text{FLOOR}(x/10),$$

where: T is the SI-Periodicity of the concerned SI message.

The SI-window for the concerned SI message starts in subframe #a of the determined radio frame. Thereafter, the known process includes receiving a downlink (DL) Signalling CHannel (DL-SCH) using the SI-RNTI from the start of the SI-window. This continues, as shown in step 130 until the end of the SI-window whose absolute length in time is provided by si-WindowLength, or until the SI message was received, excluding the following subframes:

Subframe #5 in radio frames for which SFN mod 2=0
any multicast broadcast single frequency network (MB-SFN) subframes;
any uplink subframes in the TDD mode of operation.

If the SI message was not received by the end of the SI-window in step 130, the process of reception at the next SI-window occasion, for the concerned SI message, is repeated as shown in step 135.

According to the current agreement, 3 bits are used to signal si-WindowLength and take values of 1 msec, 2 msec, 5 msec, 10 msec, 15 msec, 20 msec, and 40 msec., with one spare, unallocated value. The maximum number of SI messages supported is '32'. The SI-periodicity can take a value in the range {80 msec, 160 msec, 320 msec, 640 msec, 1280 msec, 2560 msec, 5120 msec, Spare1}. Assuming eight SI messages are supported in the delivery of system information, the periodicity of SI-messages, for example, are as shown in Table 1.

TABLE 1 periodicity of SI-messages signalled in SystemInformationBlockType1

| Order of the SI-message | Periodicity [msec] |
|---|---|
| SI-1 | 160 |
| SI-2 | 160 |
| SI-3 | 160 |
| SI-4 | 320 |
| SI-5 | 640 |
| SI-6 | 640 |
| SI-7 | 1280 |
| SI-8 | 2560 |

Assuming the SI-windowLength is 2 msec, the corresponding starting point of SI-window for above SI messages can be derived as in Table 2.

TABLE 2

Starting point of SI-windows derived according to [TS 36.331] with si-WindowLength = 2 msec.

| Order of the SI-message | Periodicity [ms] | Subframe #a | Radio frame number |
|---|---|---|---|
| SI-1 | 160 | 0 | 0, 16, 32, 48, 64 |
| SI-2 | 160 | 2 | 0, 16, 32, 48, 64 |
| SI-3 | 160 | 4 | 0, 16, 32, 48, 64 |
| SI-4 | 320 | 6 | 0, 32, 64, 96, 128 |
| SI-5 | 640 | 8 | 0, 64, 128, 192, 256 |
| SI-6 | 640 | 0 | 1, 65, 129, 193, 257 |
| SI-7 | 1280 | 2 | 1, 129, 257, 385, 513 |
| SI-8 | 2560 | 4 | 1, 257, 513, 769, 1025 |

For a frequency division duplex (FDD) mode of operation, the transmission of SI messages at a subframe level 200 is shown in FIG. 2. It is noteworthy that the procedure specified in TS 36.331 guarantees non overlapping SI-windows for different SI-messages. The restriction in the use of subframe #5 is omitted in the following analysis, as the purpose of the analysis is to compare the differences between the operation in TDD and FDD networks. Referring now to FIG. 2, there are 7 different frame configuration types are defined in [TS 36.211] for TDD networks, which is represented below in Table 3.

TABLE 3

The specified frame configuration types in known TDD networks according to [TS 36.211]

| | subframe # | | | | | | | | | |
|---|---|---|---|---|---|---|---|---|---|---|
| | 0 | 1 | 2 | 3 | 4 | 5 | 6 | 7 | 8 | 9 |
| Type 0 | D | S | U | U | U | D | S | U | U | U |
| Type 1 | D | S | U | U | D | D | S | U | U | D |
| Type 2 | D | S | U | D | D | D | S | U | D | D |
| Type 3 | D | S | U | U | U | D | D | D | D | D |
| Type 4 | D | S | U | U | D | D | D | D | D | D |
| Type 5 | D | S | U | D | D | D | D | D | D | D |
| Type 6 | D | S | U | U | U | D | S | U | U | D | where:
D represents a downlink subframe,
U represents an uplink subframe and
S represents a special frame, such that an 'S' frame can be used in both DL and UL transmission.

Considering the frame configuration type0 in Table 3, the corresponding starting points 300 of SI-windows in a TDD mode of operation is shown in FIG. 3 for an SI-WindowLength=2 msec. As shown in FIG. 3, an SI-window corresponding to an SI-2 message has entirely overlapped with uplink subframes. Hence, transmission of an SI-2 message is blocked. Similarly, transmission of SI-5 and SI-7 messages is also blocked by the presence of UL subframes. Furthermore, the transmission windows of SI-3, SI-4 and SI-8 messages are partially blocked by the UL subframes.

In this example of the known subframe configuration, transmission of SI-2, SI-3, SI-5 and SI-7 messages are not possible in a TDD network if the SI acquisition procedure as defined in [TS 36.331] is employed. The SIs are numbered according to the order of their appearance of signalling in SystemInfromationBlockType1. It is not possible to signal a null (empty) SI message in SystemInfromationBlockType1. Therefore, the transmission of SI messages which take the order 2, 3, 5, or 7 are blocked by the presence of TDD UL subframes. Thus, these messages are unable to be delivered to the UE. Hence, as the UE is not able to receive the required system information, the UE operation in TDD system is not possible.

A further illustration that considers the TDD frame configuration type1 400 is shown in tabular form in FIG. 4. The SI message configuration is as shown in Table 2.
Here, it can be seen that the SI-2 and SI-7 messages are entirely blocked by the UL subframes, while SI-4 and SI-5 messages are also partially blocked.

Furthermore, it is worth considering the SI window configurations for TDD frame configuration type 3, 4 and 6, which are illustrated in FIGS. 5A, 5B and 5C for the SI-message configuration provided in Table 2. Here, in all three illustrated cases 500, 510 and 520, a successful reception of transmitted SI-2 and SI-7 messages is not possible according to the currently specified procedure in [TS 36.331].

FIGS. 6A and 6B illustrate the SI-message configuration for TDD frame configuration type2 600 and type5 610. Here, it is clearly shown that the transmission of SI-messages is not entirely blocked by the presence of UL subframes in these two frame configurations. However, the SI-message transmission is partially blocked in SI-2, SI-4 and SI-7 messages in type2. Furthermore, SI-2 and SI-7 messages are partially blocked in type5

Thus, the above analysis illustrates that the operation of the currently specified SI acquisition procedure in TS 36.331, when applied to a TDD network with different frame configurations, is unacceptable. As explained, transmission of some SI messages is impossible with some of the TDD frame configurations. In other cases, the SI-window is partially blocked by the presence of UL subframes. Thus, the outcome of the specified procedure is different depending on the frame configuration and, hence, does not provide an accurate procedure in a TDD network.

A yet further example of the problems associated with the current LTE frame configuration is shown in FIG. 7, for a case where there is a 1 msec SI-WindowLength 700. The periodicity of SI message are as shown in Table 4 and the configuration of SI-windows is as shown in Table 5.

TABLE 4 periodicity of SI-messages signalled in SystemInformationBlockType1

| Order of the SI-message | Periodicity [msec] |
|---|---|
| SI-1 | 16 |
| SI-2 | 32 |
| SI-3 | 64 |
| SI-4 | 32 |
| SI-5 | 32 |
| SI-6 | 64 |
| SI-7 | 128 |
| SI-8 | 256 |
| SI-9 | 128 |

TABLE 5 starting point of SI-windows derived according to [TS 36.331] with SI-WindowLength = 1 msec

| Order of the SI-message | Periodicity [msec] | Subframe #a | Radio frame number |
|---|---|---|---|
| SI-1 | 16 | 0 | 0, 16, 32, 48, 64 |
| SI-2 | 32 | 1 | 0, 32, 64, 96, 128 |
| SI-3 | 64 | 2 | 0, 64, 128, 192, 256 |
| SI-4 | 32 | 3 | 0, 32, 64, 96, 128 |
| SI-5 | 32 | 4 | 0, 32, 64, 96, 128 |
| SI-6 | 64 | 5 | 0, 64, 128, 192, 256 |
| SI-7 | 128 | 6 | 0, 128, 256, 384, 512 |
| SI-8 | 256 | 7 | 0, 256, 512, 768, 1024 |
| SI-9 | 128 | 8 | 0, 128, 256, 384, 512 |

As shown in the above Tables, the transmission of SI-3 and SI-8 messages is blocked in radio configuration type0, type1 and type2, while the transmission of SI-4 and SI-9 messages is blocked in radio configurations type0 and type 2. It is also noteworthy that the SI-5 message is also blocked in type0.

Furthermore, as illustrated with respect to FIG. 3 and Table 6, the specified procedure in the current standard [TS 36.331] does not provide an accurate mechanism for transmission of SI-messages in TDD networks.

A yet further problem in the specified procedure is illustrated below, by considering a 5 msec SI-WindowLength with SI message periodicity as given in Table 1. Table 6 lists the calculated starting points of SI-messages according to the specified procedure in [TS 36.331].

TABLE 6

Starting point of SI-windows derived according to [TS 36.331] with SI-WindowLength = 5 msec

| Order of the SI-message | Periodicity [msec] | Subframe #a | Radio frame number |
|---|---|---|---|
| SI-1 | 160 | 0 | 0, 16, 32, 48, 64 |
| SI-2 | 160 | 5 | 0, 16, 32, 48, 64 |
| SI-3 | 160 | 0 | 1, 17, 33, 49, 65 |
| SI-4 | 320 | 5 | 1, 33, 65, 97, 129 |
| SI-5 | 640 | 0 | 2, 66, 130, 194, 258 |
| SI-6 | 640 | 5 | 2, 66, 130, 194, 258 |
| SI-7 | 1280 | 0 | 3, 131, 259, 387, 515 |
| SI-8 | 2560 | 5 | 3, 259, 515, 771, 1027 |

The resulting SI window configuration for TDD frame configurations in Type3 800 and Type4 810 are shown in FIGS. 8A and 8B respectively. As shown in FIG. 8 the transmission of SI-messages is not entirely blocked due to the presence of UL subframes. However, the effective SI-WindowLength for SI-1, SI-3, SI-5 and SI-7 messages has reduced to 2 msec, while the effective SI-WindowLength for SI-2, SI-4, SI-6 and SI-8 messages remains at 5 msec.

As mentioned earlier, SI-messages are repeated at every subframe (except TDD UL subframes) within the corresponding SI-window. In this example SI-1, SI-3, SI-5 and SI-7 messages can only be repeated twice while SI-2, SI-4, SI-6 and SI-8 messages can be repeated five times within the same SI-window.

The UE is able to combine the received copies of the same message at the decoder, thereby increasing the reliability of the reception. The known combining of these messages at the UE is similar to the combining method used in Hybrid Automatic Repeat reQuest (HARQ) techniques. However, in this case the message is re-transmitted a fixed number of times, which is allowed by the effective SI-WindowLength. Nevertheless, the re-transmission is not based on the feedback from the UE as in normal HARQ operation.

According to the example shown above, transmission of SI-2, SI-4, SI-6 and SI-8 messages are more robust than the transmission of SI-1, SI-3, SI-5 and SI-7 messages due to their number of repetitions with in the SI-window. However, all the system information messages should be transmitted with the same robustness as all the system information messages are equally important for the correct operation of the UE. Unequal reception reliability of the SI-messages are not seen in FDD networks as the SI-window length is defined as the number of re-transmissions of each message, and it is the same for all the SI-messages with the exception of SI-messages that are mapped onto subframe #5 of even radio frames.

Consequently, current techniques are suboptimal. Hence, an improved mechanism to address the problems of acquiring a system information message over a cellular network such as an LTE-TDD network would be advantageous.

SUMMARY OF THE INVENTION

Accordingly, the invention seeks to mitigate, alleviate or eliminate one or more of the abovementioned disadvantages singly or in any combination.

According to a first aspect of the invention there is provided a network element for a cellular communication system comprising a signal processing logic module arranged to generate a single system information message; generate a variable si-Windowlength parameter for transmission to the at least one wireless communication unit, and determine availability for downlink transmissions to the at least one wireless communication unit. The network element further comprises a transceiver arranged to transmit si-Windowlength parameter and the single system information (SI) message to the at least one wireless communication unit in a variable length transmission time window (SI window) a number of times, wherein the number of transmissions is based on the si-Windowlength parameter; wherein at least one of: a start time of a transmission of the single SI message, or a duration of the variable length transmission time window (SI window), is determined based on: (i) the si-Windowlength parameter; (ii) a transmission order; and (iii) on the availability for downlink transmissions.

In one optional embodiment, the availability for downlink transmissions may be obtained from a radio frame configuration.

In one optional embodiment, a periodicity of the number of times that the single SI message may be transmitted to the at least one wireless communication unit is indicated within the single SI message.

In one optional embodiment, the number of times that is associated with a SI window length may be configurable via a signalling message.

In one optional embodiment, the network element may be an eNodeB in a long term evolution time division duplex, LTE-TDD, cellular communication system.

According to a second aspect of the invention, there is provided a method for providing system information in a cellular communication system from a network element, substantially according to the first aspect of the invention.

According to a third aspect of the invention, there is provided a computer program product comprising program code for providing system information in a cellular communication system from a network element, substantially according to the first aspect of the invention.

According to a fourth aspect of the invention, there is provided an integrated circuit for a network element of a cellular communication system, substantially according to the first aspect of the invention.

According to a fifth aspect of the invention, there is provided a wireless subscriber communication unit comprising a receiver arranged to receive a variable si-Windowlength parameter and a single system information (SI) message from a network element of a cellular communication system; and a signal processing logic module arranged to process the received single SI message, wherein the SI message has been sent for reception in a variable length reception time window (SI window) a number of times, and wherein the number is based on the si-Windowlength parameter; wherein at least one of: a start time of a reception of the single SI message; or a duration of the variable length reception time window, is determined based on: (i) the si-Windowlength parameter; (ii) a transmission order; and (iii) on the availability for downlink transmissions.

In one optional embodiment, the signal processing logic module is further arranged to configure a SI reception window based on a radio frame configuration of a received single SI message.

According to a sixth aspect of the invention, there is provided a method for acquiring system information, SI, from a network element of a cellular communication system, substantially according to the fifth aspect of the invention.

According to a seventh aspect of the invention, there is provided computer program product comprising program code for acquiring system information, SI, from a network element of a cellular communication system, substantially according to the fifth aspect of the invention.

According to an eighth aspect of the invention, there is provided an integrated circuit for a wireless subscriber communication unit, substantially according to the fifth aspect of the invention.

According to a ninth aspect of the invention, there is provided a communication system comprising a network element arranged to transmit a system information, SI, message to a wireless subscriber communication unit in a cellular communication system, substantially according to the first and/or fifth aspects of the invention.

One embodiment of the invention may avoid the blocking of the transmission window of an SI message by the presence of a UL slot in TDD system.

Another embodiment of the invention may allow the reception of a SI message by a subscriber unit in TDD system.

A yet further embodiment of the invention may allow the transmission of SI messages with equal reliability regardless of their order of presence in the signalling message.

Embodiments of the invention may allow improved performance as perceived by the end-users, for example by retransmission of the SI messages within the transmission window.

Embodiments of the invention may allow improved performance in a cellular network by allowing the wireless subscriber units to receive a stronger desired broadcast signal.

Embodiments of the invention may allow an operation of a subscriber unit in a TDD network.

Embodiments of the invention may be compatible with some existing communication systems, such as 3GPP LTE-FDD, and LTE-TDD cellular communication systems.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

The following description focuses on embodiments of the invention applicable to a UMTS (Universal Mobile Telecommunication System) cellular communication system and in particular to an Evolved UMTS Terrestrial Radio Access Network (E-UTRAN) operating in a Time Division Duplex (TDD) mode within a $3^{rd}$ generation partnership project (3GPP) system. However, it will be appreciated that the invention is not limited to this particular cellular communication system, but may be applied to other cellular communication systems.

Figure 9:
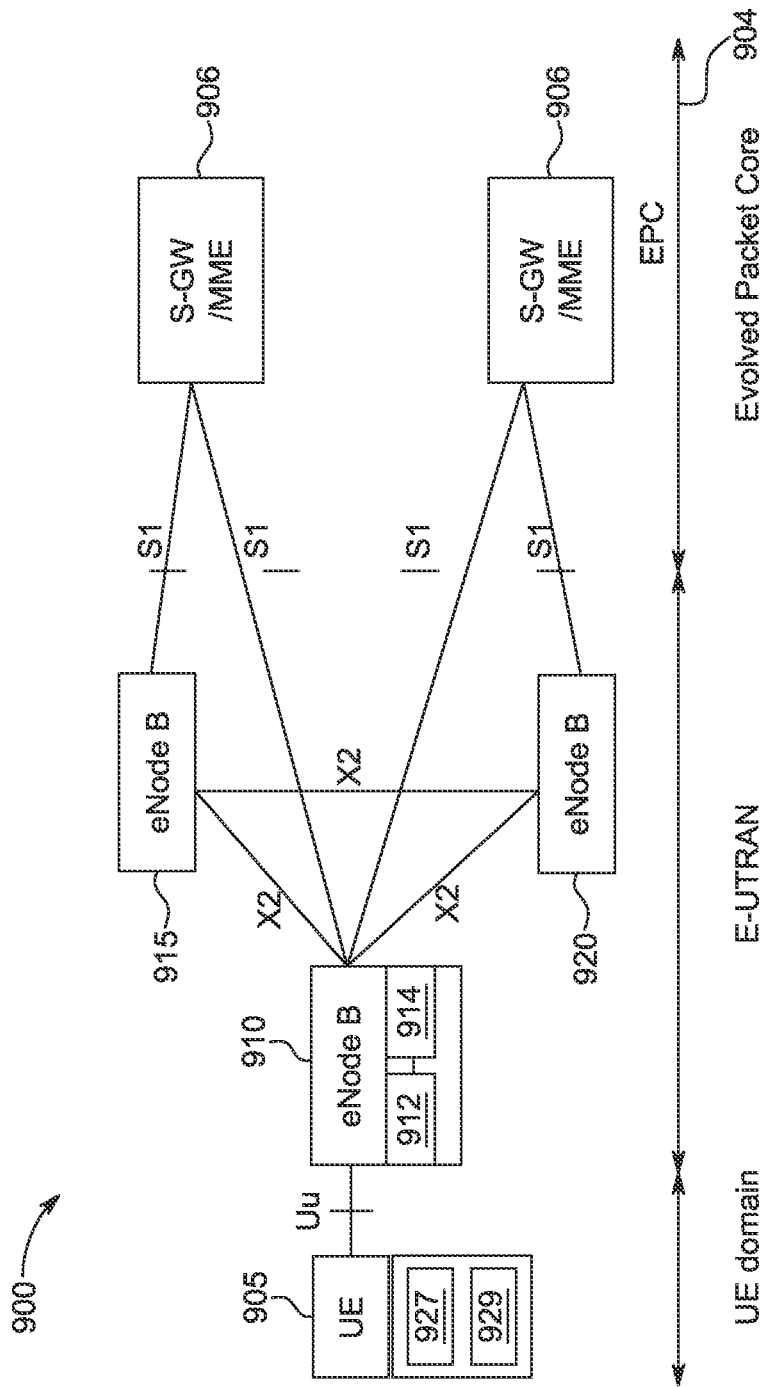
FIG. 9 illustrates an E-UTRAN System Architecture adapted in accordance with an embodiment of the invention.

Referring now to FIG. 9, a cellular-based communication system 900 is shown in outline, in accordance with one embodiment of the present invention. In this embodiment, the cellular-based communication system 900 is compliant with, and contains network elements capable of operating over, an Universal Mobile Telecommunication System (UMTS) air-interface. In particular, the following description focuses on embodiments of the invention applicable to an Evolved-UMTS cellular communication system and in particular to a Evolved-UTRAN (UMTS Terrestrial Radio Access Network (UTRAN)) operating in a Time Division Duplex (TDD) mode within a $3^{rd}$ generation partnership project (3GPP) system (described in the 3GPP TS 36.xxx series of specifications). Such a system is often referred to as a Long Term Evolution time division duplex (LTE-TDD) system. However, it will be appreciated that the invention is not limited to this particular cellular communication system, but may be applied to other cellular communication systems.

The LTE-TDD system architecture comprises of evolved radio access network (RAN) and evolved packet core (EPC) (core) network (CN) elements, with the core network 904 being coupled to external networks, such as the Internet or the public switched telephone network. A primary component of the RAN is an eNodeB (an evolved NodeB) 910, 920, which is connected to the CN 904 via S1 interface and to the UEs 905 via an Uu interface. The eNodeB 910, 920 controls and manages the radio resource related functions. The series of eNode Bs 910, 915, 920 typically perform lower layer processing for the network, performing such functions as Medium Access Control (MAC), formatting blocks of data for transmission and physically transmitting transport blocks to UEs 905.

The CN 904 has two main components: a serving access gateway (S-GW) and a mobility management entity (MME) 906. The S-GW controls the user-plane (U-plane) communication, where the management of traffic delivery is managed by the S-GW for RRC_Connected users. The MME controls the control plane (c-plane) communication, where the user mobility, bearer establishment, and QoS support are handled by the MME. Although the S-GW and MME are shown co-located, it is envisaged that in some embodiments these functional elements may be separate entities operably coupled by any known means.

E-UTRAN RAN is based on an Orthogonal Frequency Division Multiple Access (OFDMA) in downlink (DL) communications and single-carrier frequency division multiple access (SC-FDMA) in uplink (UL) communications. The further information of radio frame formats and physical layer configuration used in E-UTRAN can be found in 3GPP TS 36.211 v.1.1.1 (2007-05), "3GPP Technical specification group radio access network, physical channels and modulation (release 8)".

The eNode Bs 910, 915, 920 are connected wirelessly to the UEs 905 (with only one UE shown for clarity purposes only). Each eNode-B contains one or more transceiver unit(s) 912 operably coupled to one or more respective signal processing logic module(s) 914. Similarly, each of the UEs 905 comprise a transceiver unit 927 operably coupled to a signal processing logic module 929 (with one UE illustrated in such detail for clarity purposes only) and communicate with the eNode B supporting communication in their respective location area.

As will be appreciated, the LTE-TDD system comprises many other UEs and eNode-Bs, which, for clarity purposes only, are not shown.

In accordance with one embodiment of the invention, eNode-B 910, and in particular the operation of the transceiver unit 912 and signal processing logic module 914 has been adapted to configure the transmission windows of the SI-messages that are transmitted to a UE, such as UE 905, to signal a radio frame configuration. The radio frame configuration in the SI message generated by the signal processing logic module 914 comprises a value that determines the number of times that each system information message is transmitted, together with an indication of the periodicities of system information messages. The transceiver unit 912 of the eNode-B 910 transmits these SI messages taking into account the availability for downlink transmissions (i.e. the radio frame configuration in TDD network). The UE 905 receives and processes these SI messages and configures the system information reception window taking into account the availability for downlink transmission.

Notably, only one SI message is generated by each eNodeB at a given time. As a consequence, there is no overlapping system information delivery. The same System information message is transmitted a number of times, where the number of repeated transmissions is defined by an SI-window length. Thus, every SI-message is transmitted by a network controller a number of times (which is configurable via signalling), to provide an equal robustness for different messages in the transmission.

Figure 10:
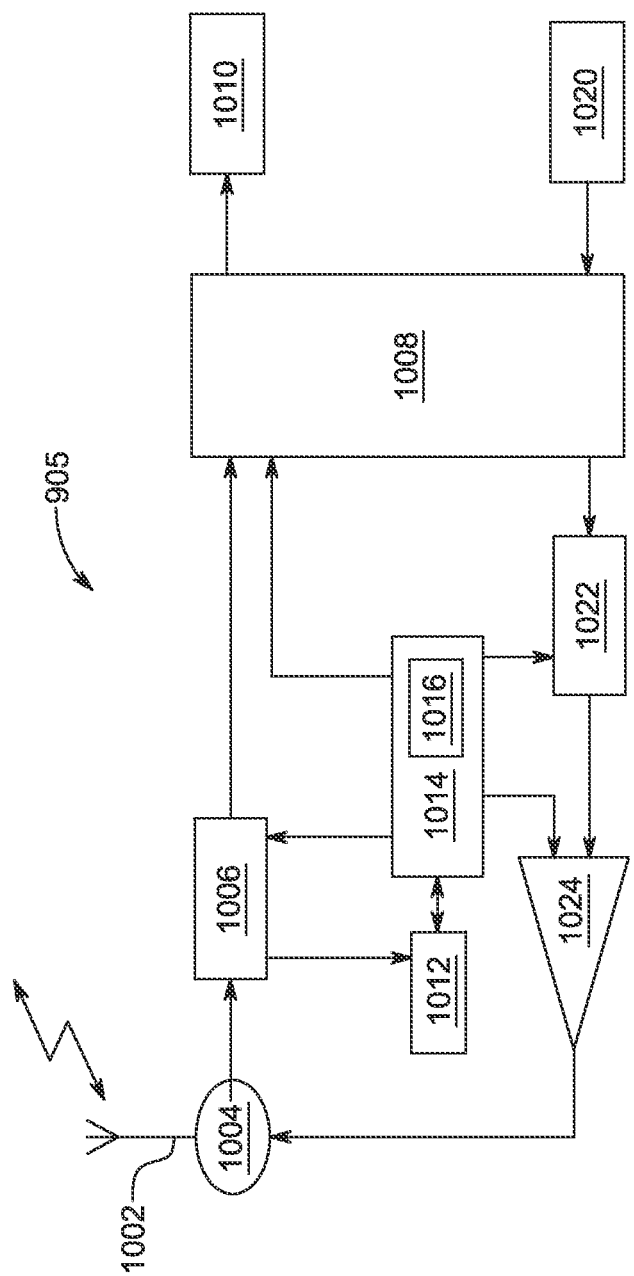
FIG. 10 illustrates a wireless communication unit adapted in accordance with an embodiment of the invention.

Referring next to FIG. 10, a block diagram of a wireless communication unit 905 (often referred to as user equipment (UE) in the context of a 3GPP cellular communications system) is shown in more detail, in accordance with one embodiment of the invention.

The UE 905 contains an antenna 1002 preferably coupled to a duplex filter or antenna switch 1004 that provides isolation between receive and transmit chains within the UE 905. The receiver chain comprises receiver front-end circuitry 1006 (effectively providing reception, filtering and intermediate or base-band frequency conversion). The front-end circuitry 1006 is serially coupled to a signal processing logic module 1008. An output from the signal processing logic module 1008 is provided to a suitable output device 1010, such as a screen or flat panel display. The receiver chain also includes received signal strength indicator (RSSI) circuitry 1012, which in turn is coupled to a controller 1014 that maintains overall subscriber unit control. The controller 1014 is also coupled to the receiver front-end circuitry 1006 and the signal processing logic module 1008 (generally realised by a digital signal processor (DSP)). The controller is also coupled to a memory device 1016 that selectively stores operating regimes, such as decoding/encoding functions, synchronisation patterns, code sequences, RSSI data, direction of arrival of a received signal and the like.

Conventionally, and as described above, a time window is defined as a time interval between a start of a transmission to the end of the transmission. Therefore, the term "SI window" is considered as the time between the start of the SI message transmission to the end of the SI message transmission. From the UE point of view, the UE expects to receive the SI message during this time interval.

In accordance with one embodiment of the invention, the signal processing logic module 1008 is adapted to receive and process only one value for the SI-WindowLength that is signalled in SystemInformationBlockType1 from an eNodeB. Based on this received value, the signal processing logic module 1008 configures the window length, in the time domain, for each SI-message. Notably, the configuration takes into account, and is based on, the TDD frame configuration. The SI-WindowLength in the time domain equals the time window (msec) that contains a number of DL subframes equals to the number signalled in SI-WindowLength. Thus, the SI-WindowLength can be considered as the effective window length of the SI-message. The signalling required to initiate the procedure is kept the as same as for an FDD mode of operation.

As regards the transmit chain, this essentially includes an input device 1020, such as a keypad, coupled in series through transmitter/modulation circuitry 1022 and a power amplifier 1024 to the antenna 1002. The transmitter/modulation circuitry 1022 and the power amplifier 1024 are operationally responsive to the controller 1014. The signal processor logic module 1008 in the transmit chain may be implemented as distinct from the processor in the receive chain. Alternatively, a single processor logic module may be used to implement processing of both transmit and receive signals, as shown in FIG. 10. Clearly, the various components within the UE 905 can be realised in discrete or integrated component form, with an ultimate structure therefore being merely an application-specific or design selection.

In accordance with one embodiment of the invention, as mentioned above, the signal processing logic module 1008 has been adapted to configure the starting point of SI-window (both in terms of the subframe number and radio frame number) to take into account the TDD frame configuration. The subframe #a where the corresponding SI-window starts in the corresponding radio frame is calculated as:

$$a = x \bmod y.$$

where $x=(n-1)*w$, where w is the si-WindowLength and
y equals the number of DL subframes contained in a radio frame.

In one embodiment of the invention, the calculation of 'y' may also include the special frame in a TDD mode of operation. The radio frame which the SI-window starts is determined by the signal processing logic module 1008 as $$\text{SFN} \bmod T = \text{FLOOR}(x/y);$$

Where:
T is the si-Periodicity of the concerned SI message.

Thus, embodiments of the invention describe a mechanism whereby the SI acquisition procedure is designed to take into account the TDD frame configurations. Furthermore, in one embodiment of the invention, the commonality between FDD and TDD modes of operation is maintained, thereby requiring minimal changes to the current LTE-TDD specification.

In this manner, embodiments of the invention may alleviate the problems in the operation of currently specified SI acquisition procedure in TDD networks.

Figure 11:
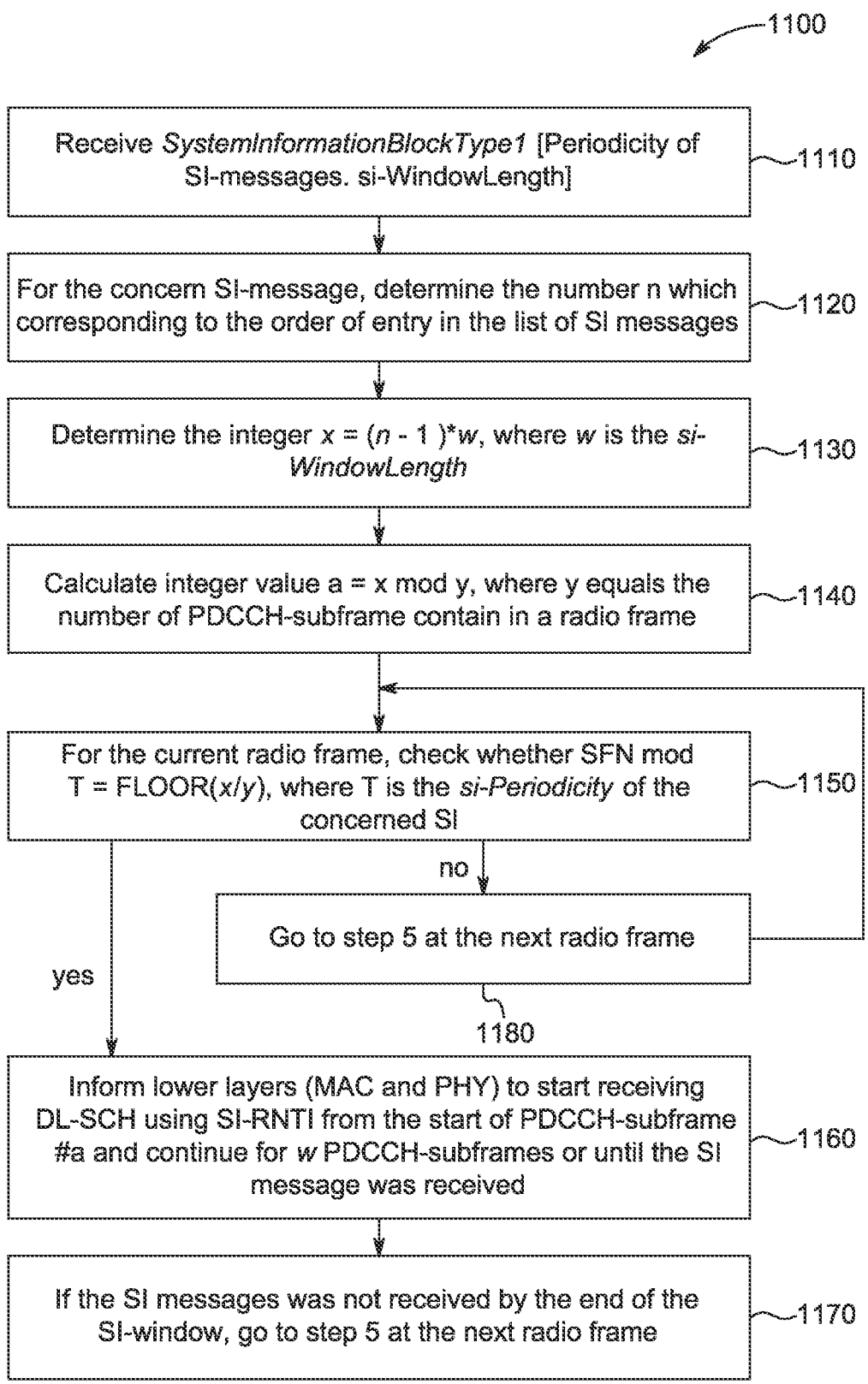
FIG. 11 illustrates a flow diagram describing the SI acquisition procedure adopted at a UE in accordance with some embodiments of the invention.

Referring now to FIG. 11, a flowchart 1100 describing the SI acquisition procedure adopted at a UE is illustrated, in accordance with an embodiment of the invention. The flowchart 1100 commences in step 1110 at the UE with a reception of a SystemInformationBlockType1 message. Once the concerned SI message has been received by the UE in step 1110, the UE processes the message and determines the number n that corresponds to the order of entry in the list of SI messages 1120. The list of SI messages is configured by schedulingInformation signalled in the SystemInformationBlockType1.

Next, in step 1130, the signal processing logic unit in the UE then determines the integer value $x=(n-1)*w$, where w is the si-WindowLength and the value of si-WindowLength is signalled to the UE in SystemInformationBlockType1. In accordance with embodiments of the invention, only one si-WindowLength is used for all the System Information Messages (SIs) configured in SystemInformationBlockType1.

Next, in step 1140, the signal processing logic unit in the UE then calculates subframe #a, such that $a=x \bmod y$.

where y equals the number of PDCCH-subframes contained in a radio frame. In this regard, Subframe #a is the PDCCH-subframe which the SI-window for the concerned SI message is started. Here, in an LTE-FDD context, the PDCCH-subframe represents any subframe and in an LTE-TDD context, the PDCCH-subframe represents only downlink subframes, optionally including the special subframe.

Next, in step 1150, the signal processing logic unit in the UE then determines, for the current radio frame, which SFN mod $T=FLOOR(x/y)$, Where: T is the si-Periodicity of the concerned SI message. The SI-window for the concerned SI message starts in PDCCH-subframe #a of the radio frame that is determined in Step 1150. If SFN mod $T \neq FLOOR(x/y)$ in step 1150, then the process moves to step 1180, where the flowchart loops to the next radio frame that is received and processed, as the value of n, x, y remain the same. If a system information change notification is received, then the process starts from the beginning.

Next, in step 1160, the signal processing logic unit in the UE then receives a DL-SCH using the SI-RNTI from the start of the SI-window. The signal processing logic unit in the UE then continues to receive and process the received signalling message until the end of the SI-window, whose length in PDCCH-subframe is given by si-WindowLength, is reached or until the SI message was received, excluding the following subframes:

Subframe #5 in radio frames for which SFN mod 2=0 any MBSFN subframes.

If the SI message was not received by the end of the SI-window in step 1160, then the UE repeats reception at the next SI-window occasion for the concerned SI message 1170.

Figure 12:
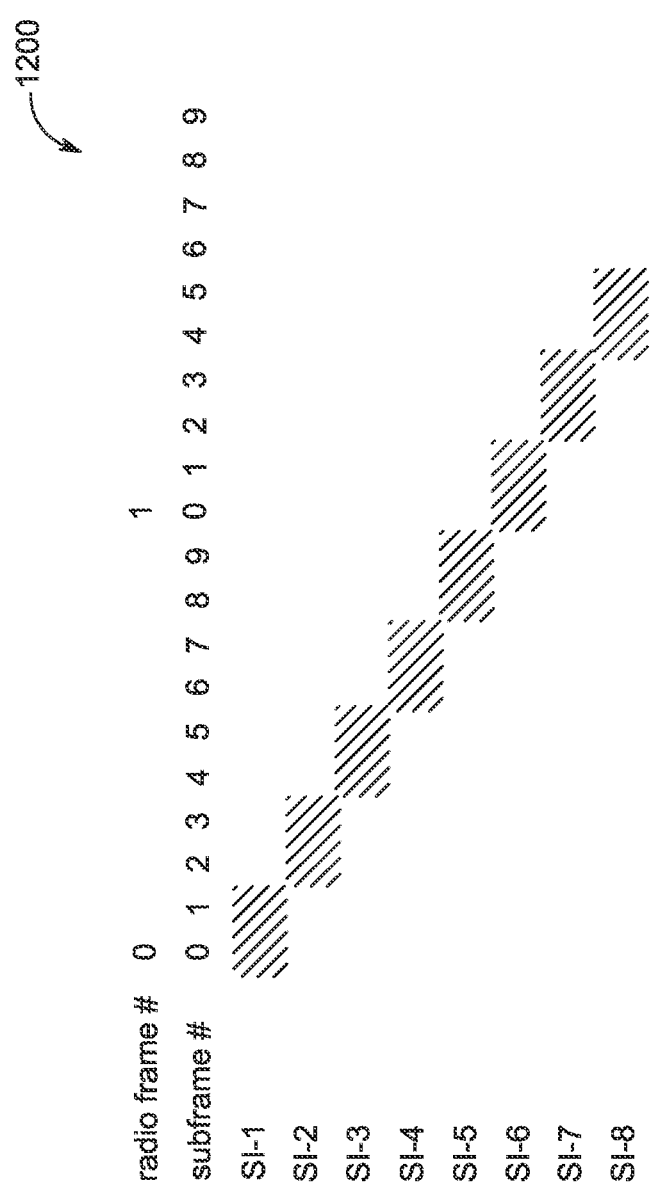
FIG. 12 illustrates in tabular form a transmission of SI-messages in FDD mode with an SI-WindowLength=2 msec. in accordance with some embodiments of the invention.
Figure 13A:
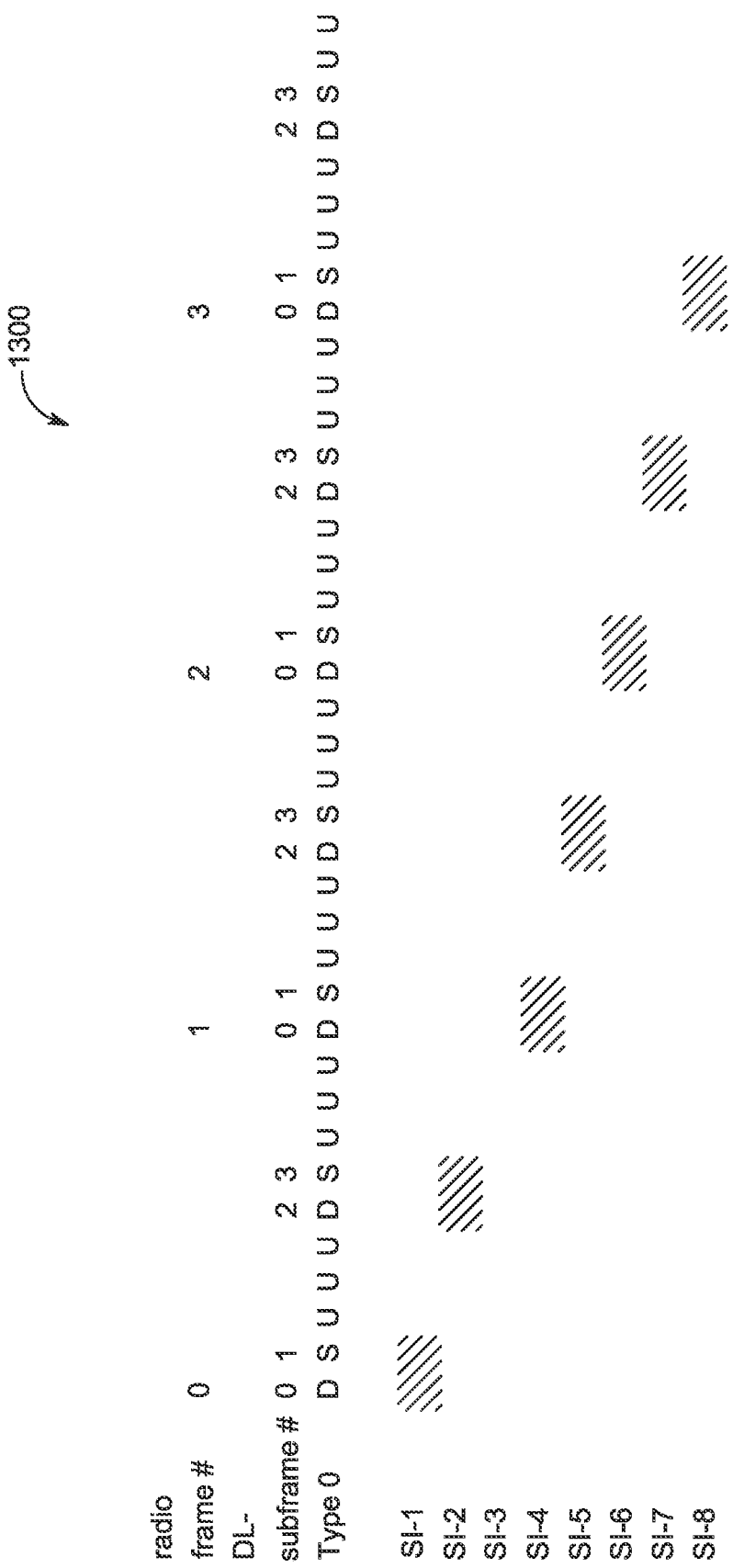
FIG. 13A, 13B, 13C, 13D, 13E illustrates in tabular form a transmission of SI-messages in TDD [with frame configuration type0, type1, type3, type4 and type6] with an SI-WindowLength=2 msec in accordance with an embodiment of the invention.
Figure 13B:
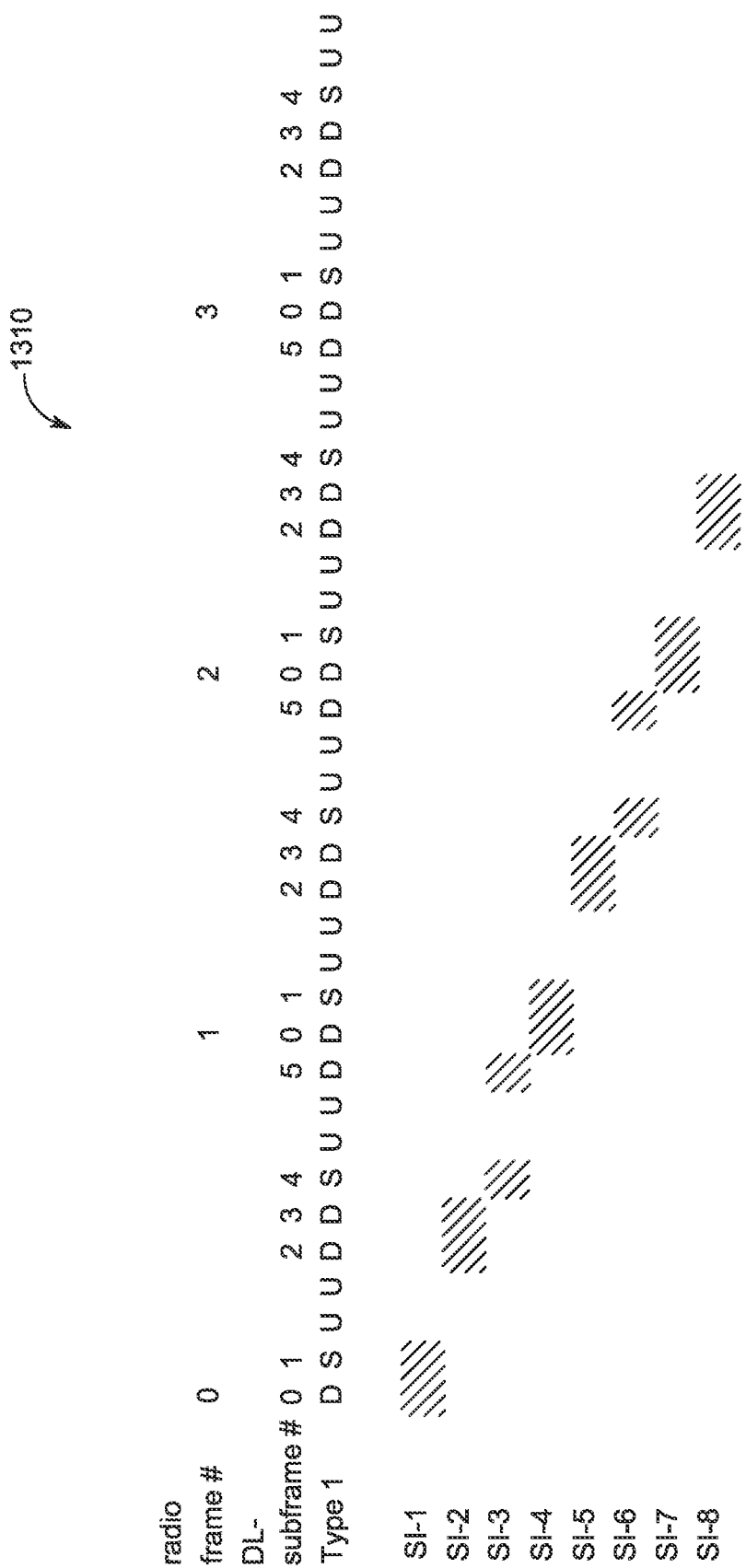
Figure 13C:
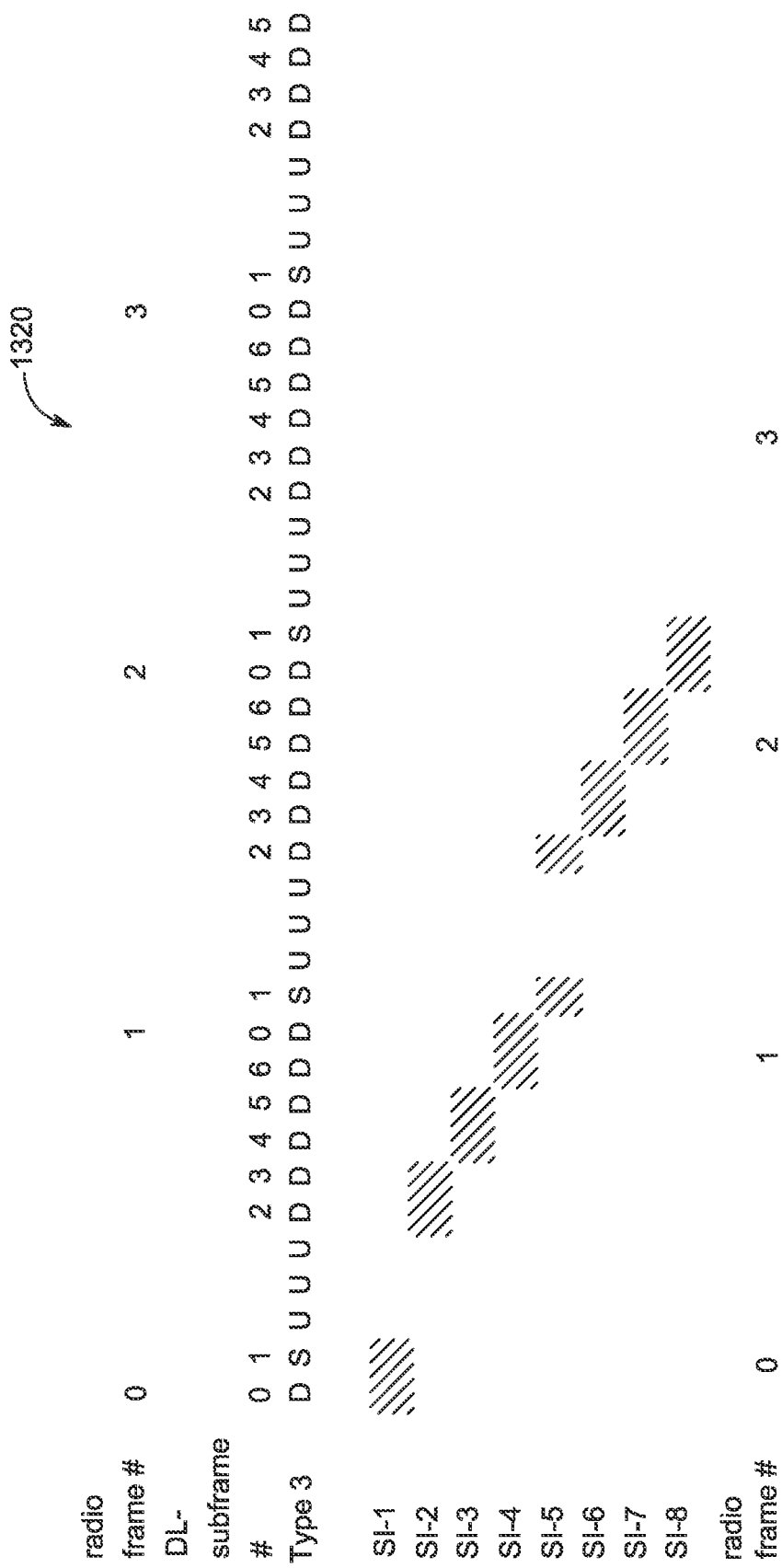
Figure 13D:
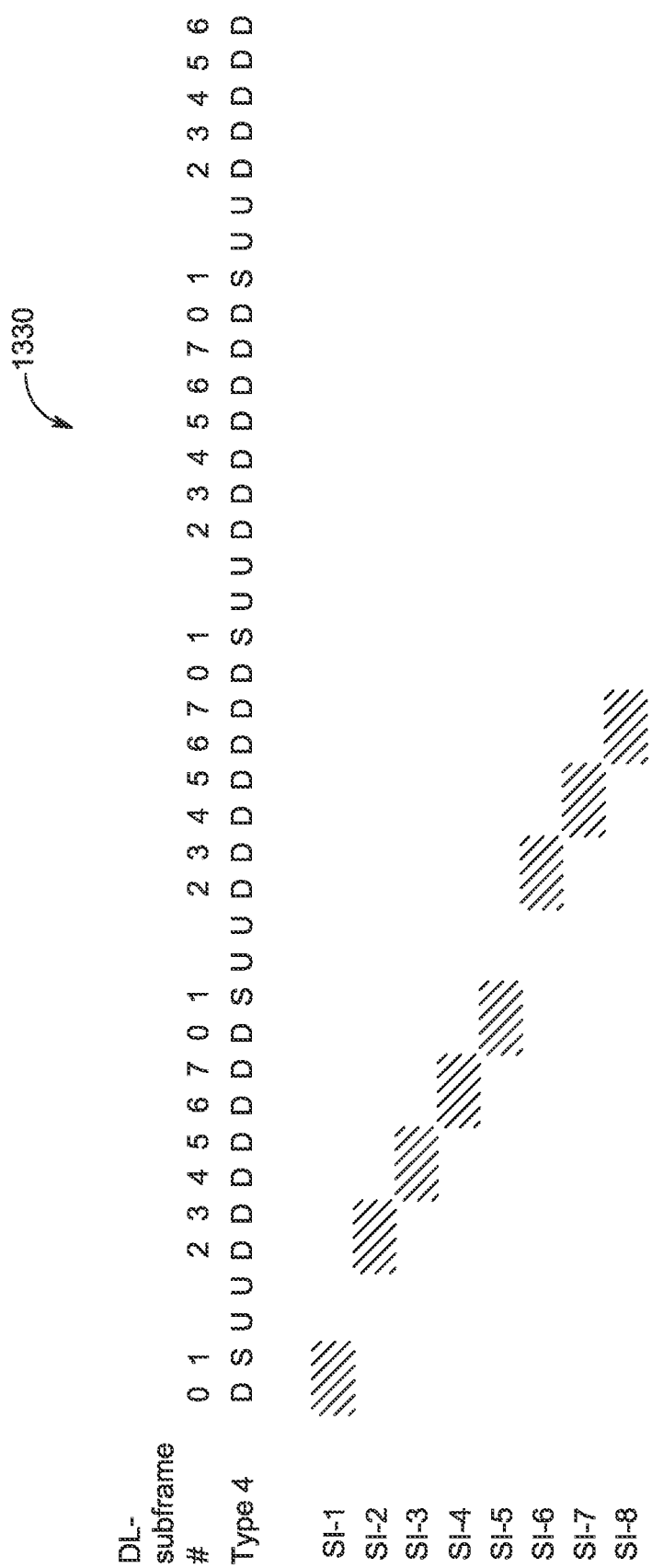
Figure 13E:
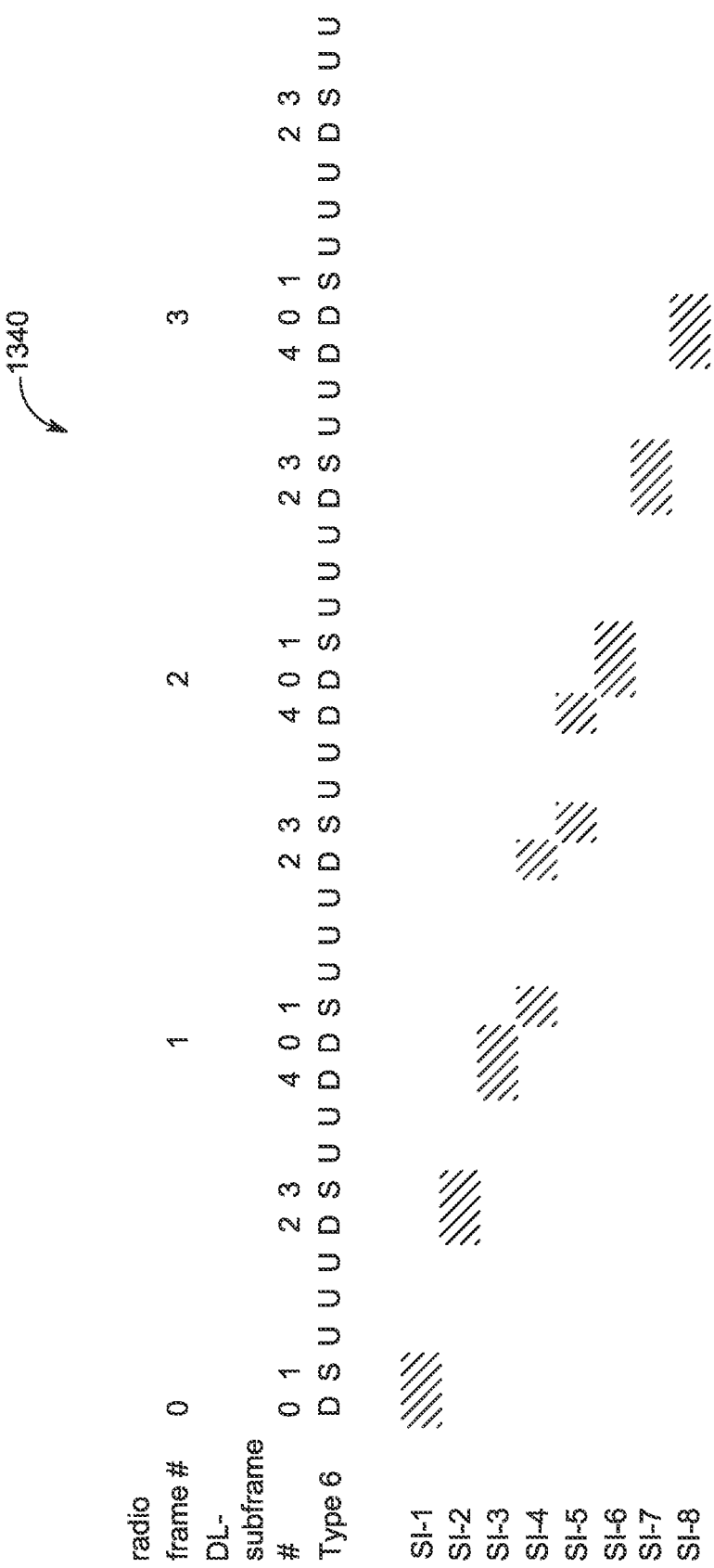

Referring now to FIG. 12, a transmission of SI-messages in FDD mode is illustrated in tabular form with an SI-WindowLength=2 msec 1200. The SI-message configuration in such an FDD network can be derived as shown in Table 7 below. It is noteworthy that this provides the same configuration as though it is derived based on the currently specified procedure in the standard, in that no modification of the transmission of SI-messages is required in an FDD network.

TABLE 7

Starting point of SI-windows derived according to the present invention with si-WindowLength = 2 msec in an FDD network.

| Order of the SI-message | Periodicity [msec] | DL-Subframe #a | Radio frame number |
|---|---|---|---|
| SI-1 | 160 | 0 | 0, 16, 32, 48, 64 |
| SI-2 | 160 | 2 | 0, 16, 32, 48, 64 |
| SI-3 | 160 | 4 | 0, 16, 32, 48, 64 |
| SI-4 | 320 | 6 | 0, 32, 64, 96, 128 |
| SI-5 | 640 | 8 | 0, 64, 128, 192, 256 |
| SI-6 | 640 | 0 | 1, 65, 129, 193, 257 |
| SI-7 | 1280 | 2 | 1, 129, 257, 385, 513 |
| SI-8 | 2560 | 4 | 1, 257, 513, 769, 1025 |

Figure 1:
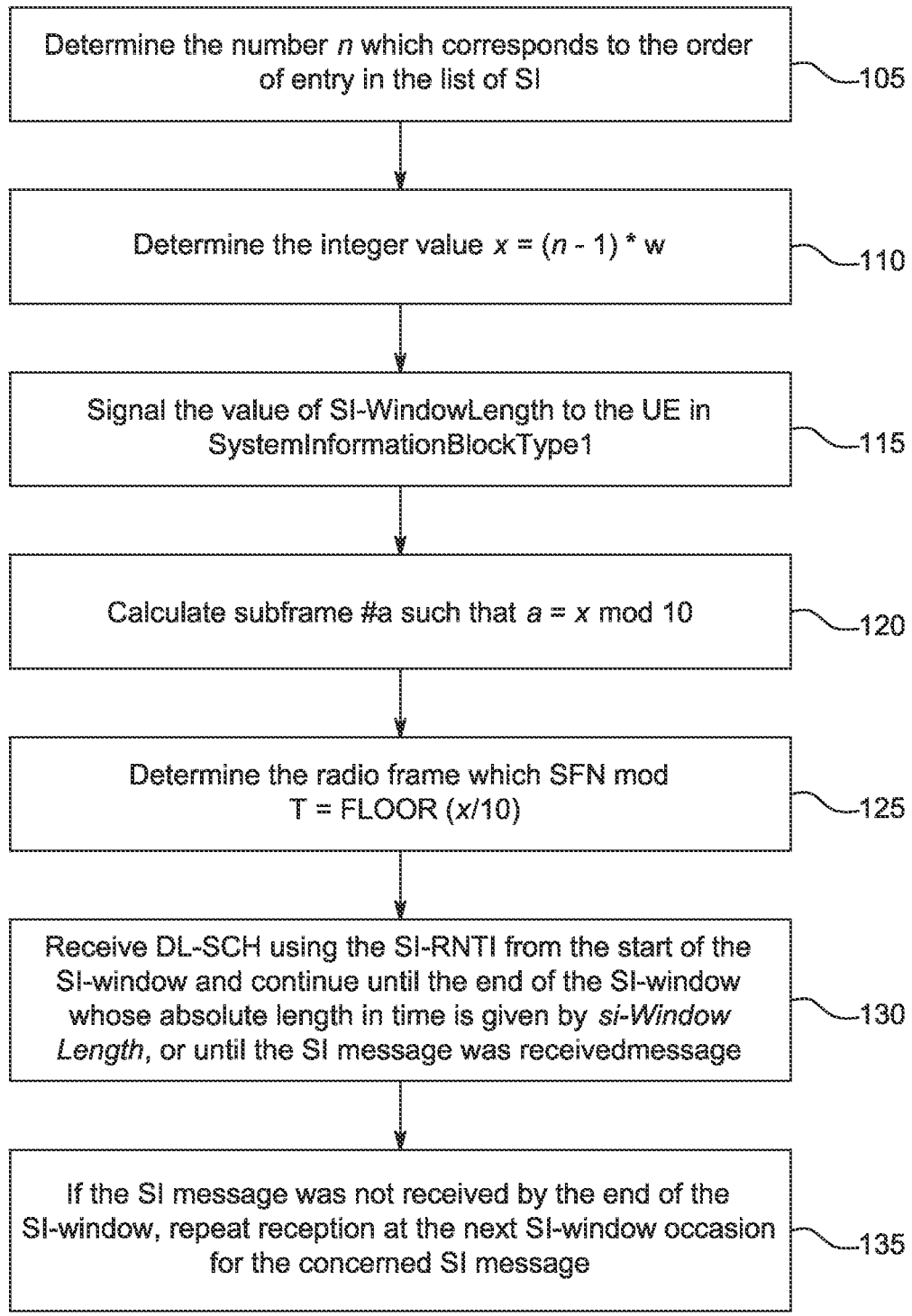
FIG. 1 illustrates a known process of determining a start of an SI window for a particular SI message.
Figure 2:
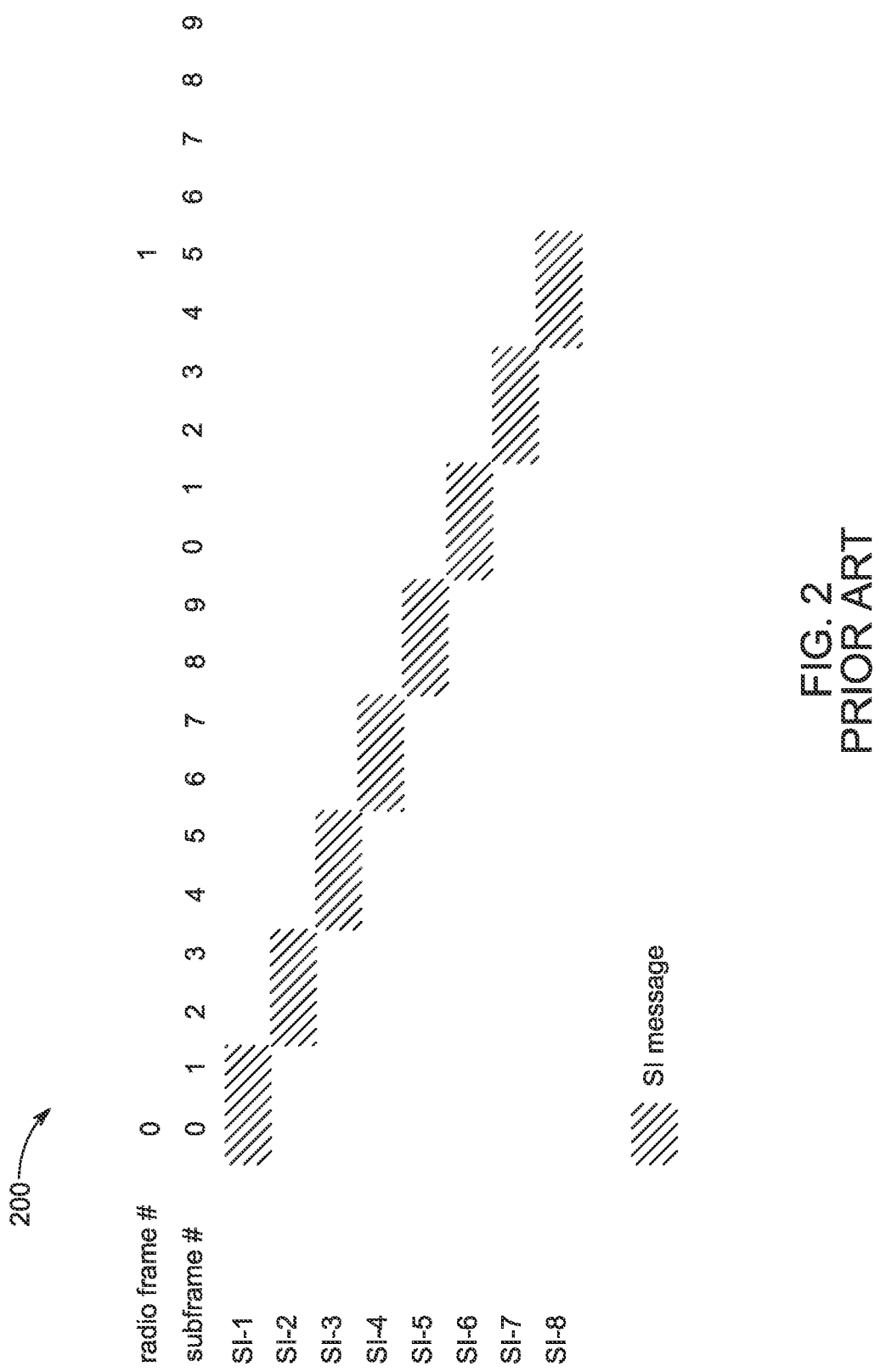
FIG. 2 illustrates in tabular form a known transmission of SI-messages in FDD mode according to [TS 36.331] with an SI-WindowLength=2 msec.
Figure 3:
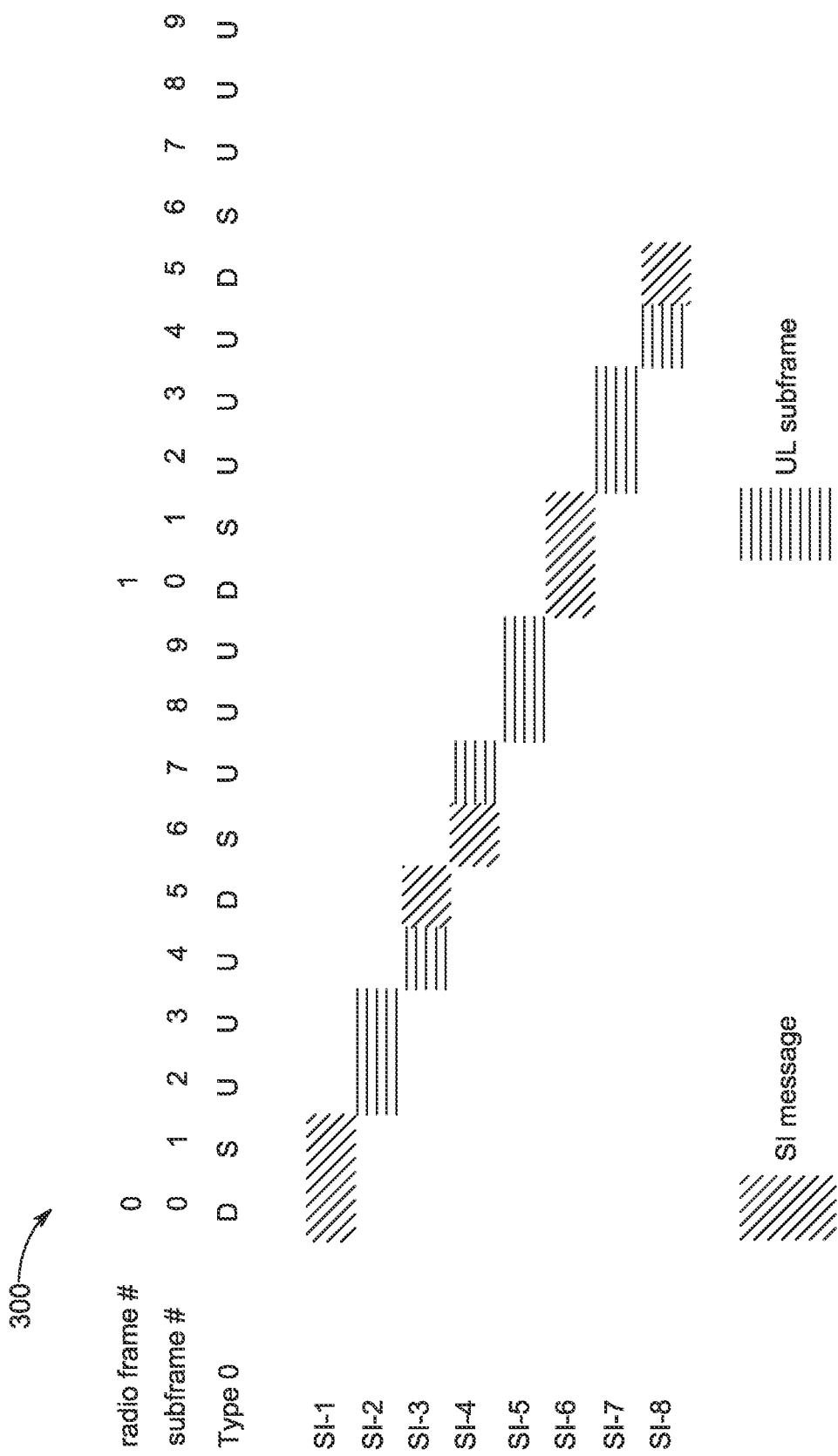
FIG. 3 illustrates in tabular form a known transmission of SI-messages in TDD mode [with type 0] according to [TS 36.331] with an SI-WindowLength=2 msec.
Figure 4:
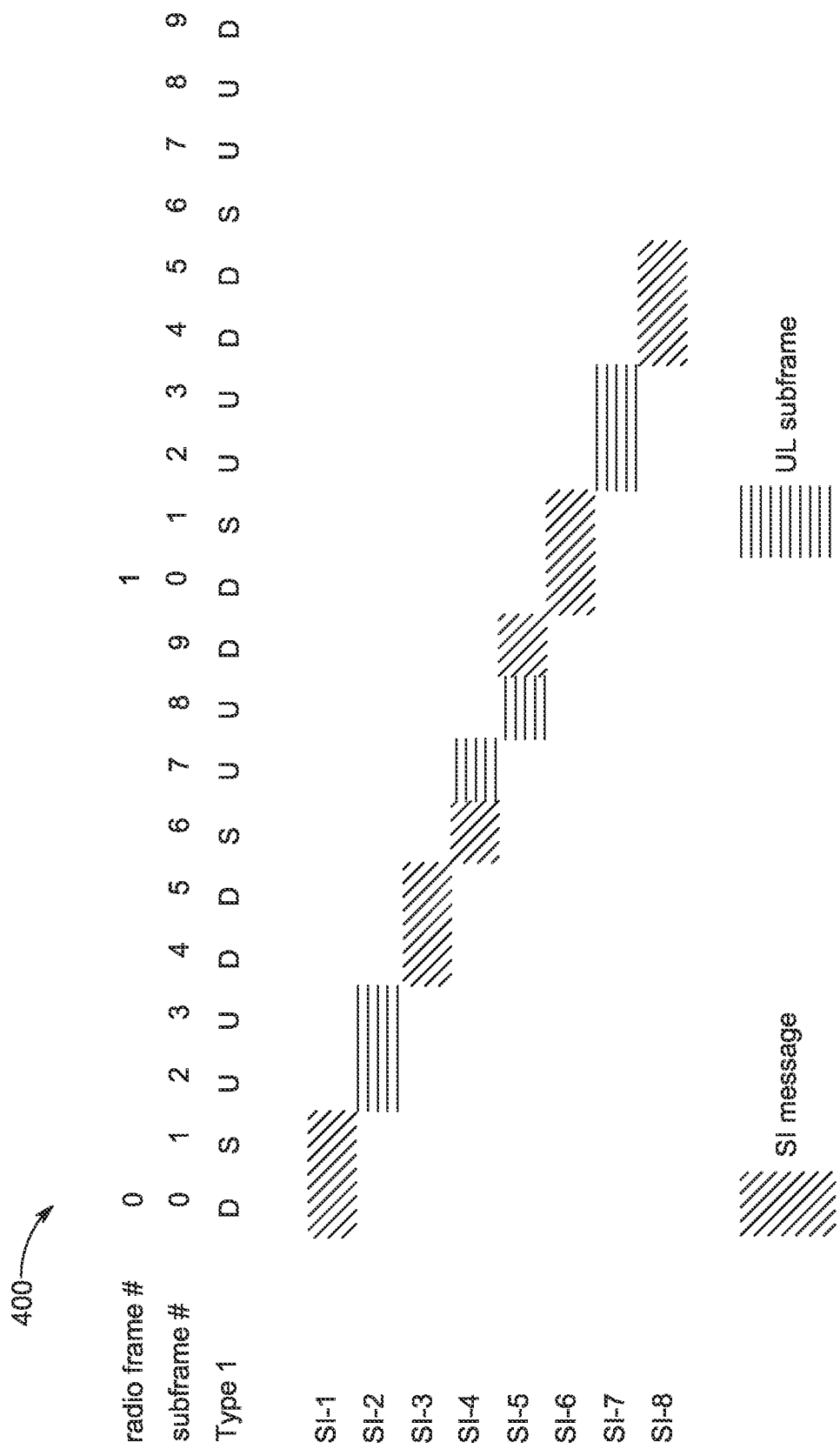
FIG. 4 illustrates in tabular form a known transmission of SI-messages in a time division duplex (TDD) mode of operation [with type1], according to [TS 36.331] with an SI-WindowLength=2 msec.
Figure 5A:
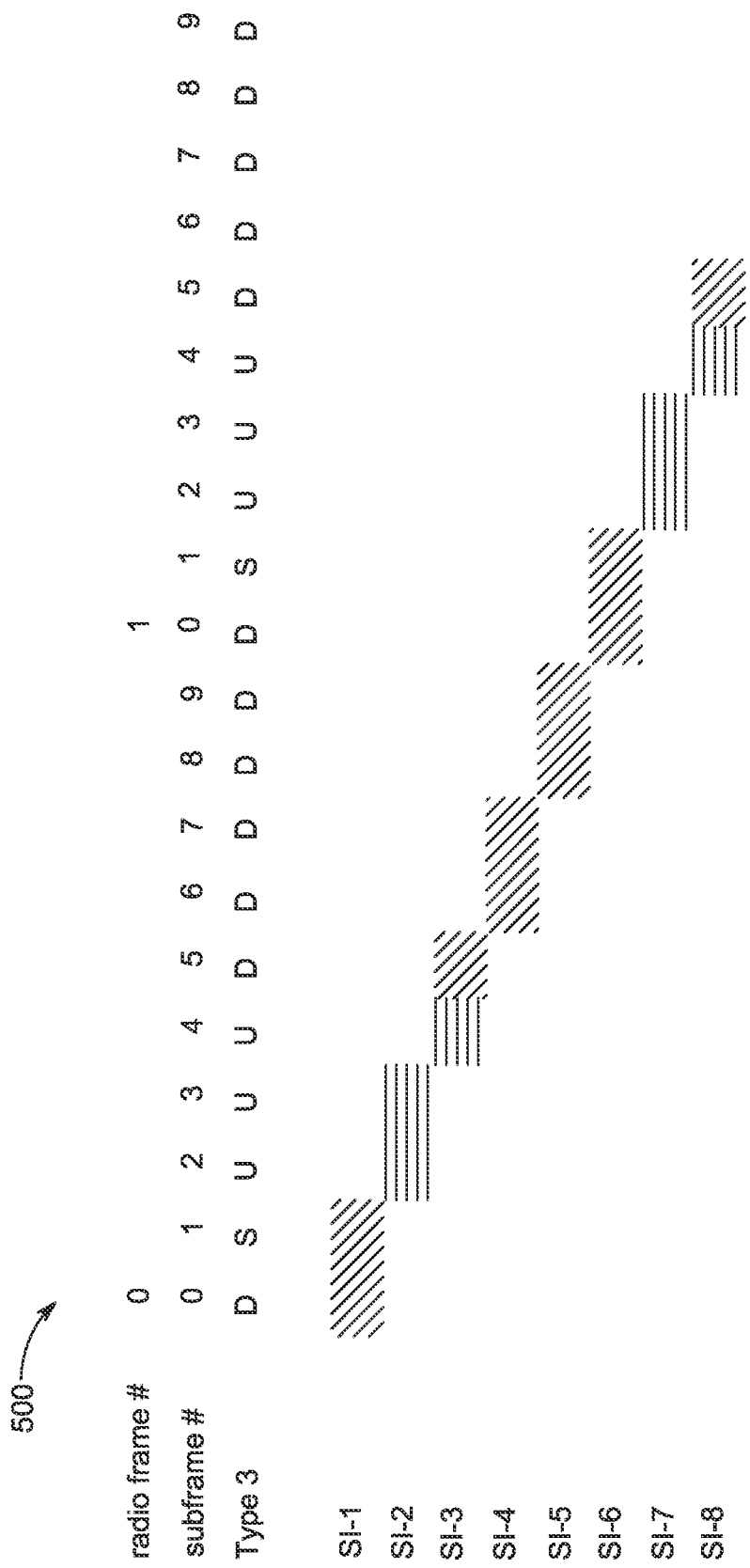
FIG. 5A, 5B, 5C illustrates in tabular form a known transmission of SI-messages in TDD mode [with type 3, 4 and 6] according to [TS 36.331], with a SI-WindowLength=2 msec.
Figure 5B:
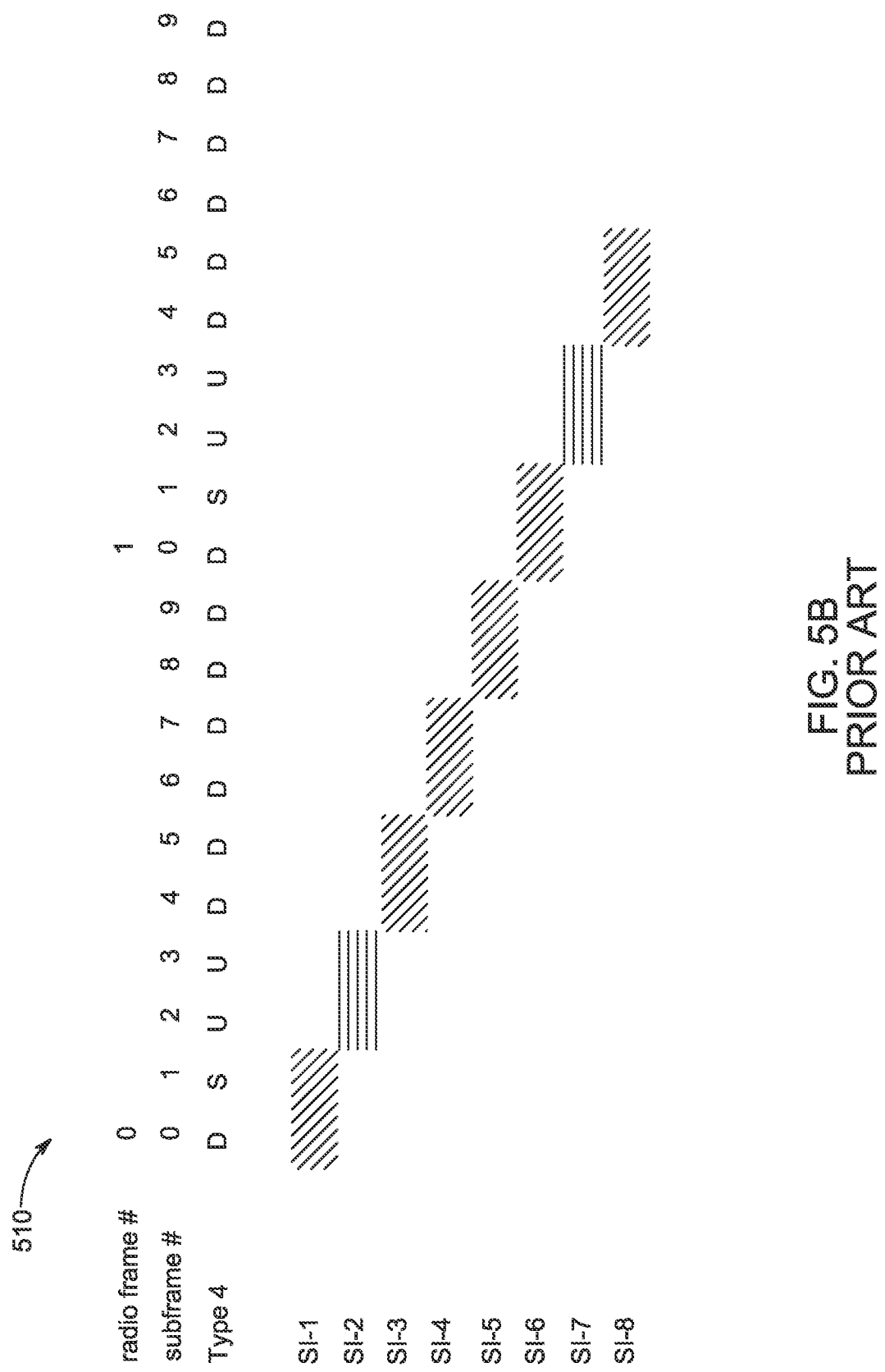
Figure 5C:
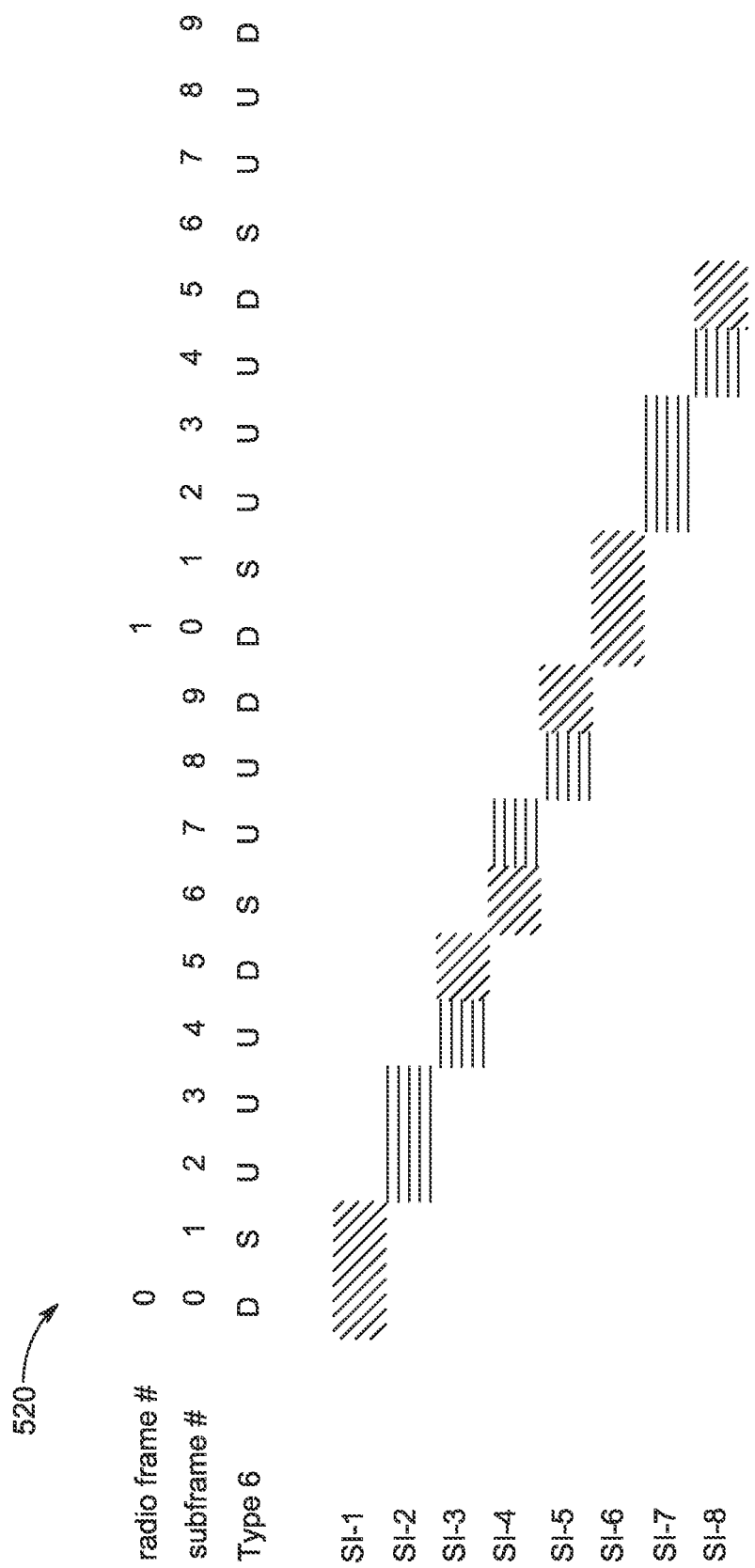
Figure 6A:
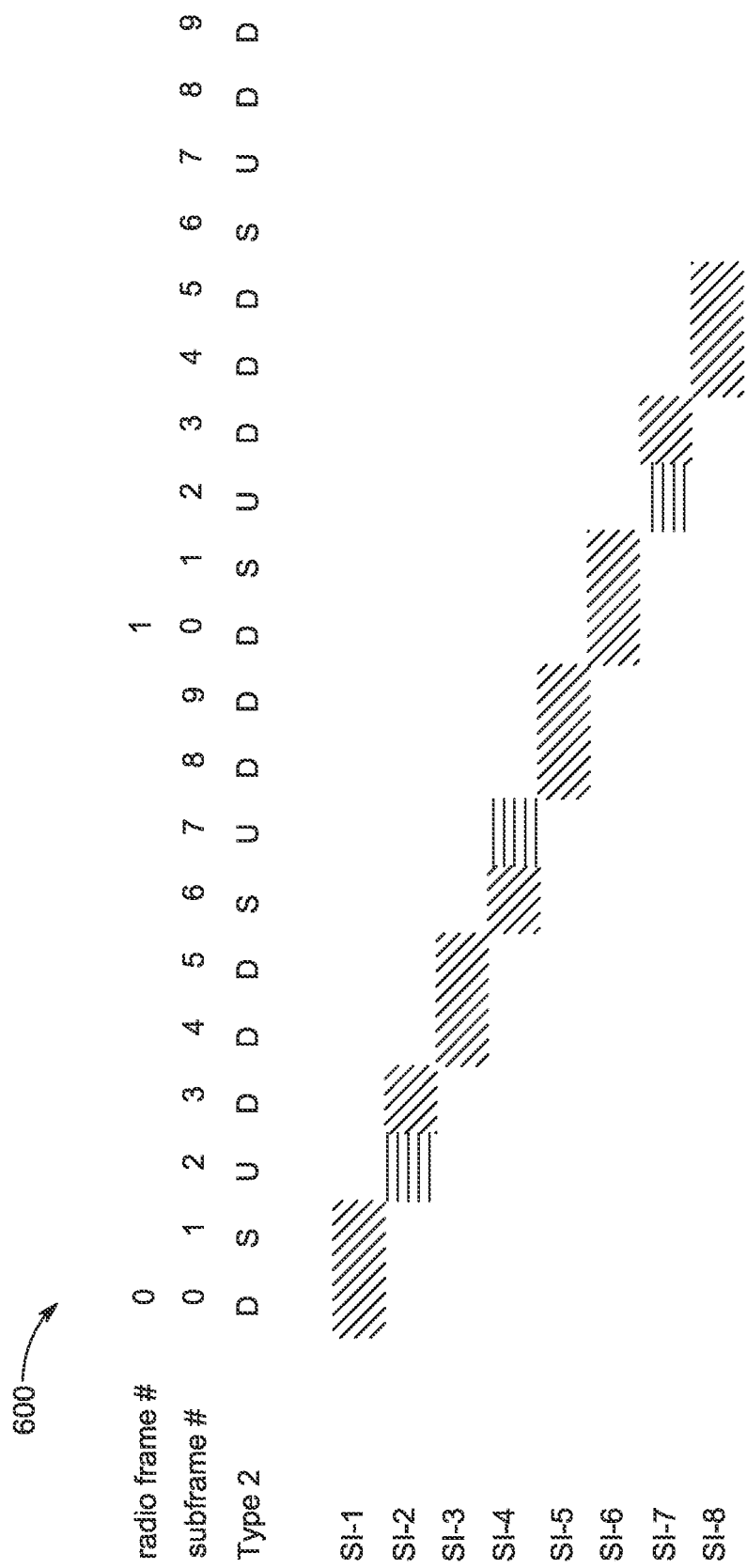
FIG. 6A, 6B illustrates in tabular form a known transmission of SI-messages in TDD mode [with type 2 and 5] according to [TS 36.331] with an SI-WindowLength=2 msec.
Figure 6B:
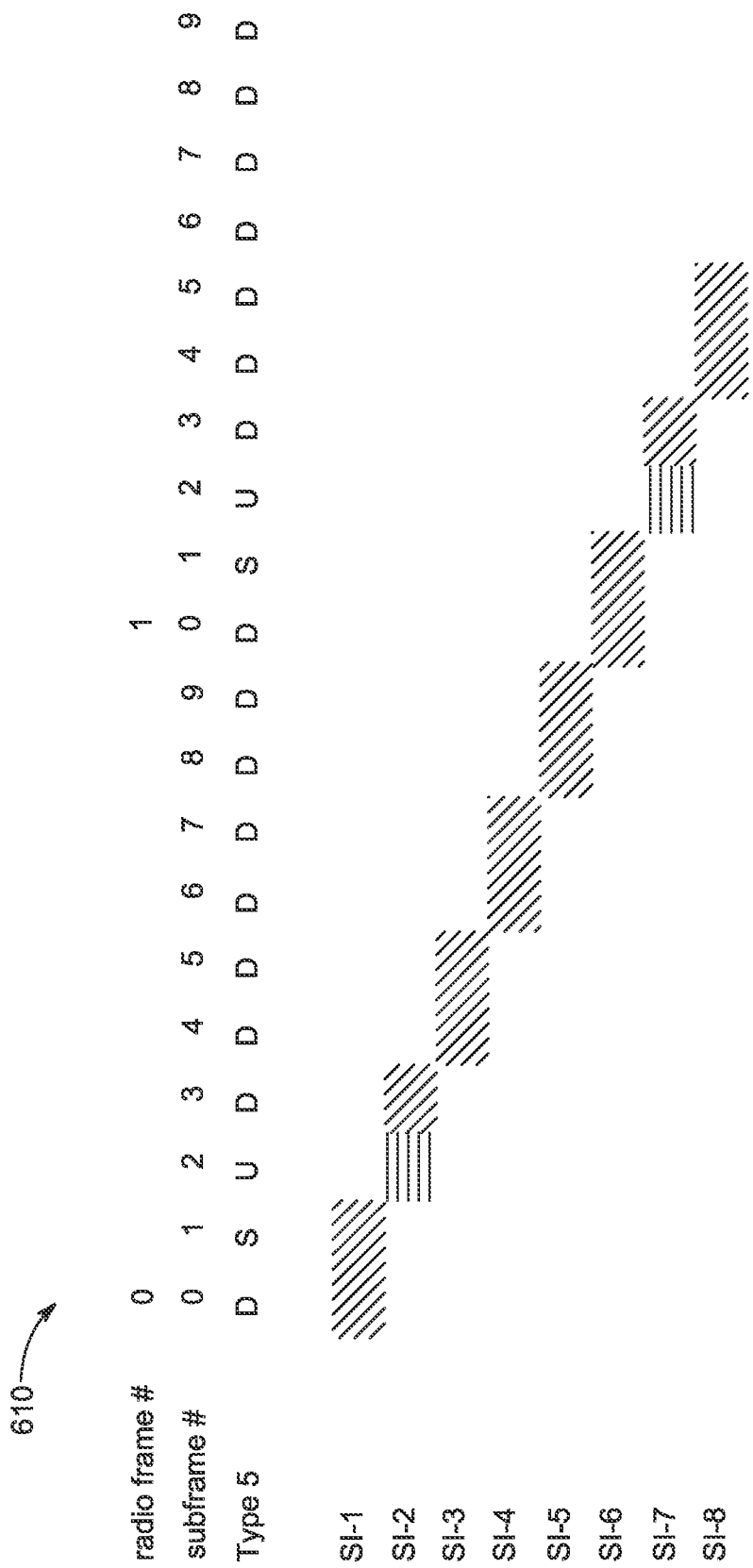
Figure 7:
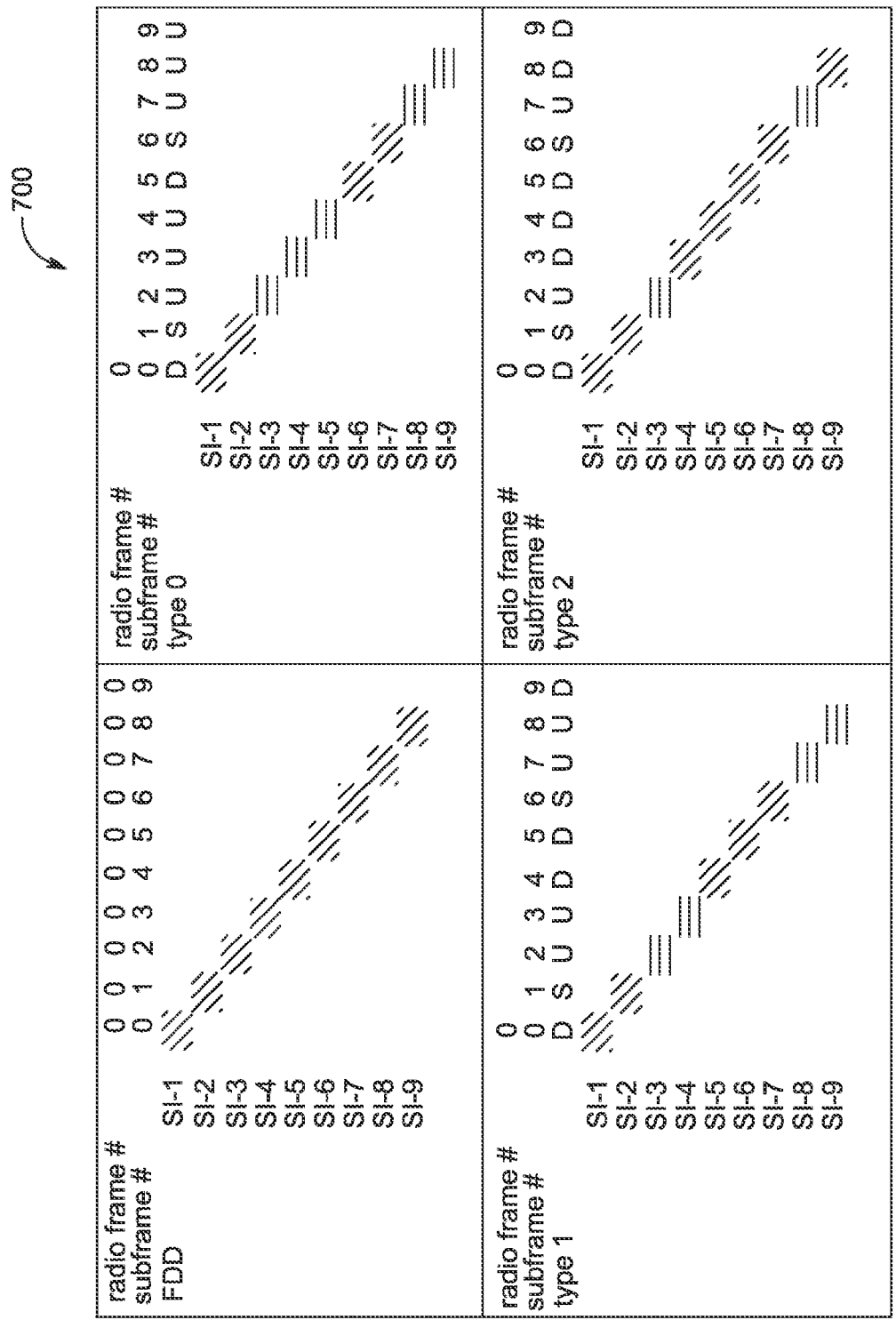
FIG. 7 illustrates in tabular form a known transmission of SI-messages according to [TS 36.331] with a SI-WindowLength=1 msec.
Figure 8A:
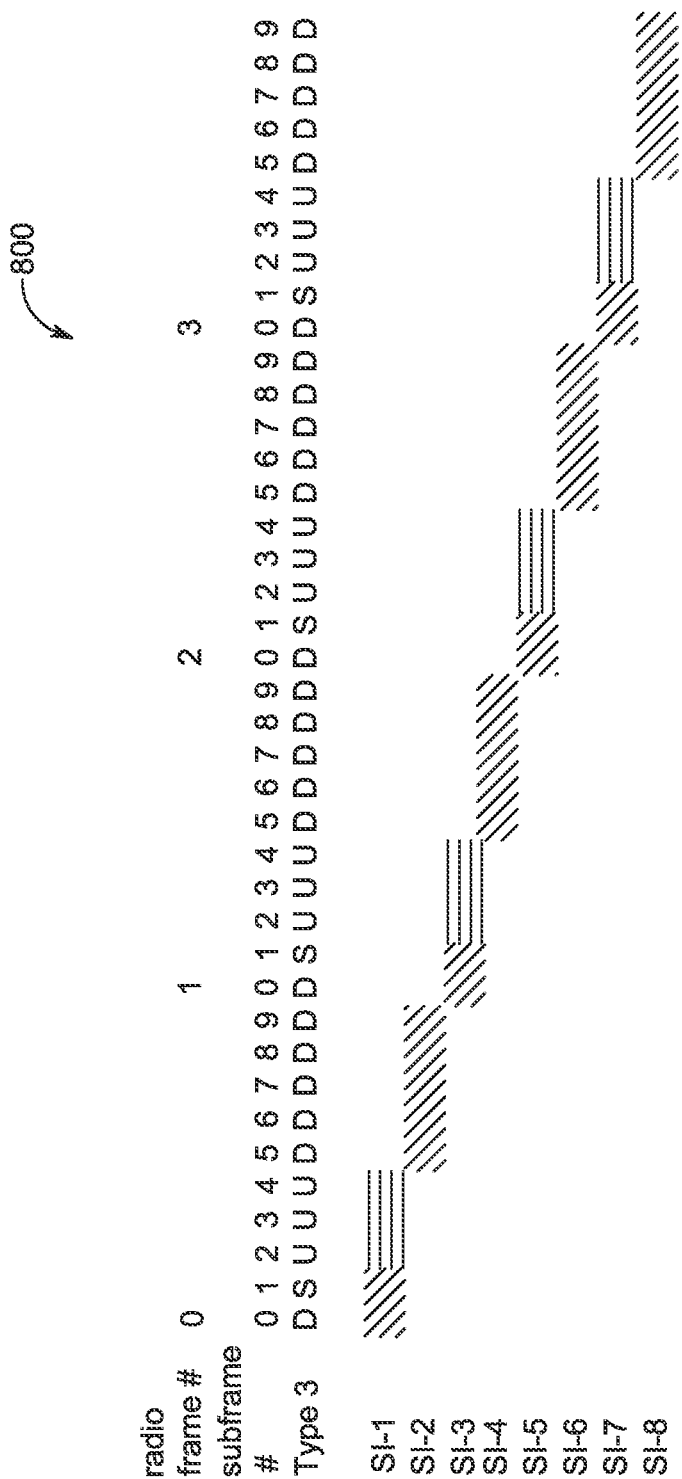
FIG. 8A, 8B illustrates in tabular form a known transmission of SI-messages in TDD mode [with type 3 and 4] according to [TS 36.331] SI-WindowLength=5 msec.
Figure 8B:
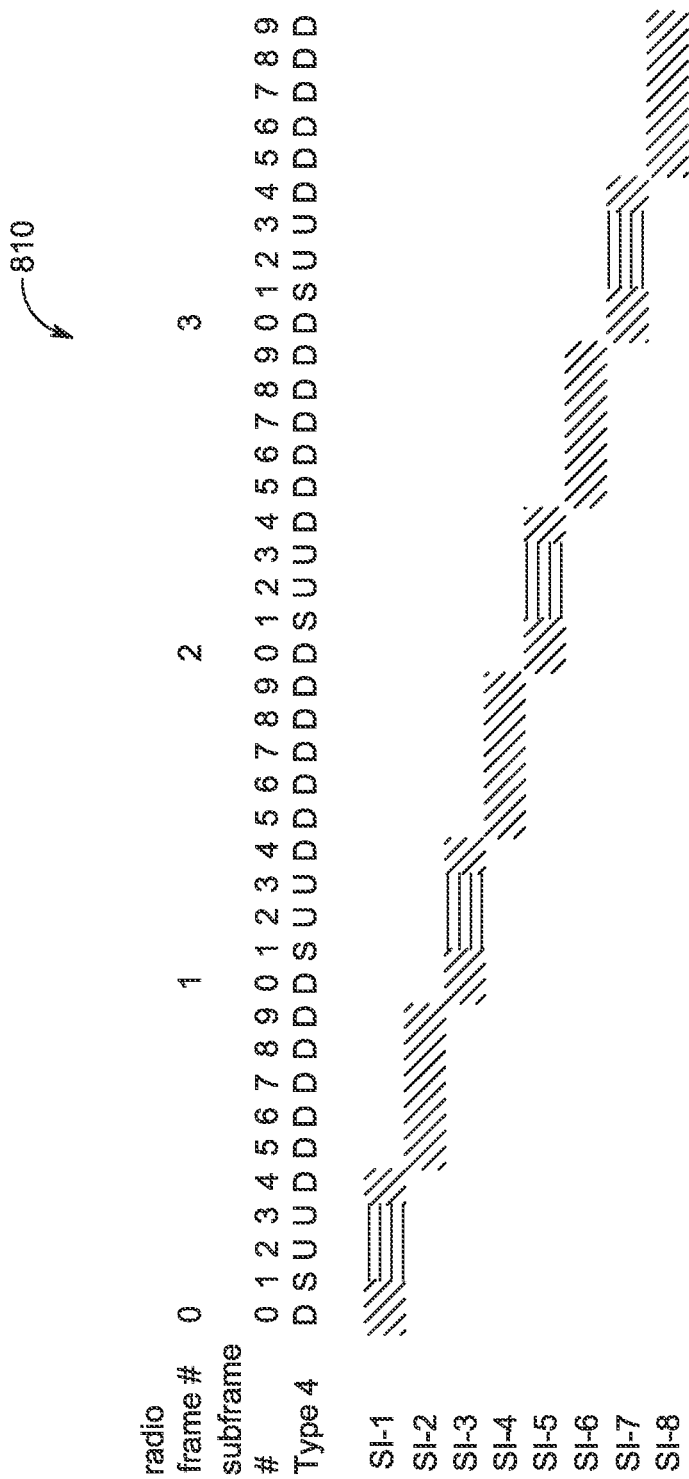

Referring now to FIGS. 13A, 13B, 13C, 13D and 13E a transmission of SI-messages in TDD networks [with frame configuration type0, type1, type3, type4 and type6] are illustrated in tabular form with an SI-WindowLength=2 msec, in accordance with an embodiment of the invention. The same frame configurations as illustrated in FIGS. 3 to 5 are used for comparison purposes only.

In addition, Table 8 lists the starting point of SI-windows calculated according to an embodiment of the invention.

TABLE 8

Starting point of SI-windows derived according to the present invention with SI-WindowLength = 2 msec in TDD network

| Order of the SI-message | DL-Subframe #a | Radio frame number |
|---|---|---|
| Type0 | | |
| SI-1 | 0 | 0, 16, 32, 48, 64 |
| SI-2 | 2 | 0, 16, 32, 48, 64 |
| SI-3 | 0 | 1, 17, 33, 49, 65 |
| SI-4 | 2 | 1, 33, 65, 97, 129 |
| SI-5 | 0 | 2, 66, 130, 194, 258 |
| SI-6 | 2 | 2, 66, 130, 194, 258 |
| SI-7 | 0 | 3, 131, 259, 387, 515 |
| SI-8 | 2 | 3, 259, 515, 771, 1027 |
| Type1 | | |
| SI-1 | 0 | 0, 16, 32, 48, 64 |
| SI-2 | 2 | 0, 16, 32, 48, 64 |
| SI-3 | 4 | 0, 16, 32, 48, 64 |
| SI-4 | 0 | 1, 33, 65, 97, 129 |
| SI-5 | 2 | 1, 65, 129, 193, 257 |
| SI-6 | 4 | 1, 65, 129, 193, 257 |
| SI-7 | 0 | 2, 130, 258, 386, 514 |
| SI-8 | 2 | 2, 258, 514, 770, 1026 |
| Type3 | | |
| SI-1 | 0 | 0, 16, 32, 48, 64 |
| SI-2 | 2 | 0, 16, 32, 48, 64 |
| SI-3 | 4 | 0, 16, 32, 48, 64 |
| SI-4 | 6 | 0, 32, 64, 96, 128 |
| SI-5 | 1 | 1, 65, 129, 193, 257 |
| SI-6 | 3 | 1, 65, 129, 193, 257 |
| SI-7 | 5 | 1, 129, 257, 385, 513 |
| SI-8 | 0 | 2, 258, 514, 770, 1026 |
| Type4 | | |
| SI-1 | 0 | 0, 16, 32, 48, 64 |
| SI-2 | 2 | 0, 16, 32, 48, 64 |
| SI-3 | 4 | 0, 16, 32, 48, 64 |
| SI-4 | 6 | 0, 32, 64, 96, 128 |
| SI-5 | 0 | 1, 65, 129, 193, 257 |
| SI-6 | 2 | 1, 65, 129, 193, 257 |
| SI-7 | 4 | 1, 129, 257, 385, 513 |
| SI-8 | 6 | 1, 257, 513, 769, 1025 |

TABLE 8-continued

Starting point of SI-windows derived according to the present invention with SI-WindowLength = 2 msec in TDD network

| Order of the SI-message | DL-Subframe #a | Radio frame number |
|---|---|---|
| | Type6 | |
| SI-1 | 0 | 0, 16, 32, 48, 64 |
| SI-2 | 2 | 0, 16, 32, 48, 64 |
| SI-3 | 4 | 0, 16, 32, 48, 64 |
| SI-4 | 1 | 1, 33, 65, 97, 129 |
| S1-5 | 3 | 1, 65, 129, 193, 257 |
| SI-6 | 0 | 2, 66, 130, 194, 258 |
| SI-7 | 2 | 2, 130, 258, 386, 514 |
| S1-8 | 4 | 2, 258, 514, 770, 1026 |

As illustrated in FIGS. 13A, 13B, 13C, 13D and 13E, none of the SI-messages is blocked by the presence of UL subframes. It is also noteworthy that the SI-WindowLength in the time domain has increased for some SI messages, depending on the frame configuration even though the effective SI-WindowLength equals 2 msec, which is signalled in SystemInformationBlockType1.

Figure 14A:
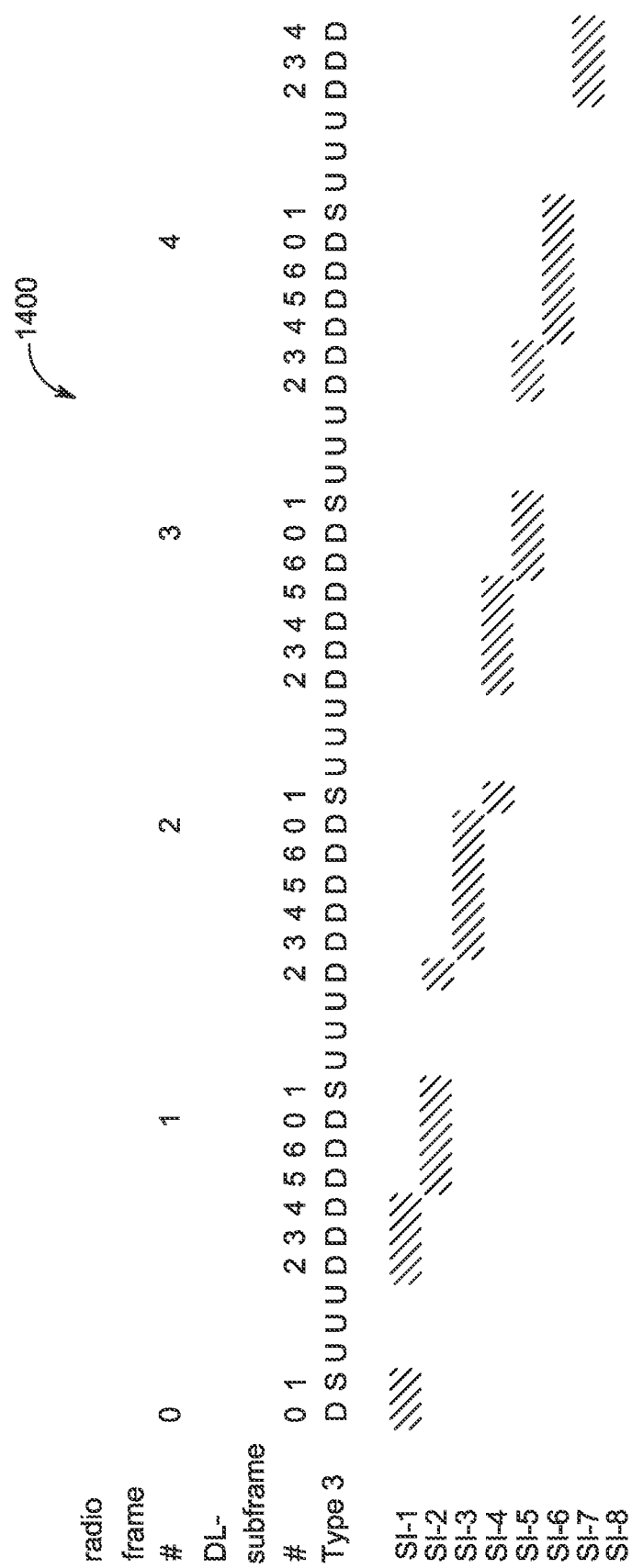
FIG. 14A, 14B illustrates in tabular form a transmission of SI-messages in TDD mode [with frame configuration type3 and type4] with an SI-WindowLength=5 msec. in accordance with an embodiment of the invention.
Figure 14B:
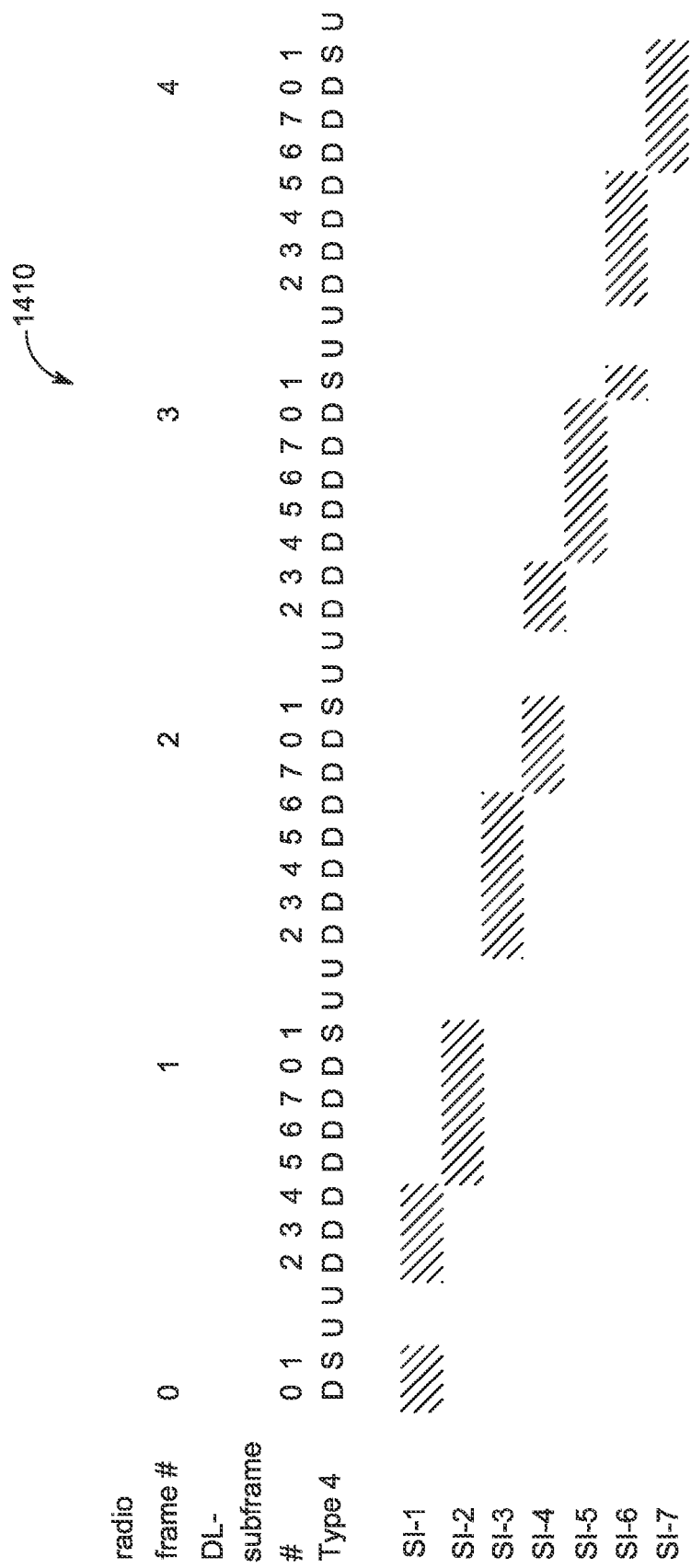

Referring now to FIG. 14A, 14B, a transmission of SI-messages in TDD networks is illustrated in tabular form [with frame configuration type3 and type4] with an SI-WindowLength=5 msec. in accordance with an embodiment of the invention. The configuration allows the transmission of each SI-message at most five times within the corresponding SI-window. This guarantees the equal robustness of the SI-messages transmission.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

It is envisaged that the aforementioned inventive concept aims to provide one or more of the following advantages:

(i) Transmission of system information (SI) messages in a wireless communication system.

(ii) Reception of SI messages by a subscriber unit in wireless communication system.

(iii) Correct operation of a subscriber unit in a wireless communication system.

(iv) It allows the transmission of different SI messages with similar reliability in a wireless communication system.

(v) Improved reception capability of a SI messages by a subscriber unit.

(vi) It allows a fast acquiring of a SI message by a subscriber unit in a wireless communication system.

(vii) It significantly saves the battery life of a subscriber unit due to the reduction in time spend on acquiring a SI messages.

As will be appreciated by a skilled artisan, only those logical/functional components necessary for describing the inventive concept are illustrated herein, and accordingly RRM logic, etc. may comprise further logical/functional components (not shown).

While the invention has been described in terms of particular embodiments and illustrative figures, those of ordinary skill in the art will recognize that the invention is not limited to the embodiments or figures described. Although embodiments of the invention are described, in some instances, with respect to a mechanism for acquiring System information messages in an LTE-TDD network, it is envisaged that the embodiments may be applied to any other cellular network, where system information messages are used and need to be acquired.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term 'logic' herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 15:
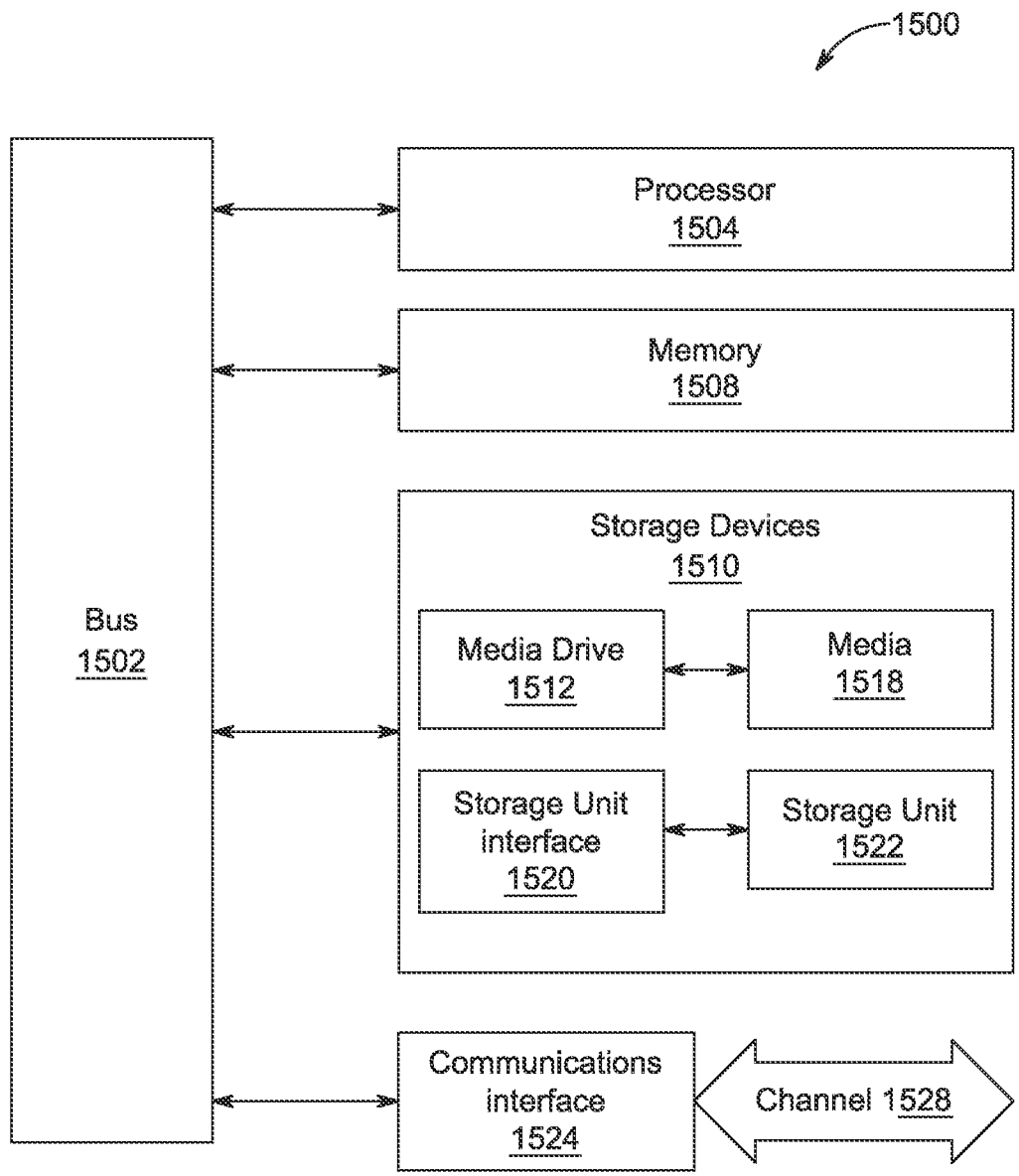
FIG. 15 illustrates a typical computing system that may be employed to implement processing functionality in embodiments of the invention.

FIG. 15 illustrates a typical computing system 1500 that may be employed to implement processing functionality in embodiments of the invention. Computing systems of this type may be used in the Broadcast Integrated Network Controller (in particular, the RRM logic, for example. Those skilled in the relevant art will also recognize how to implement the invention using other computer systems or architectures. Computing system 1500 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1500 can include one or more processors, such as a processor 1504. Processor 1504 can be implemented using a general or special purpose processing engine such as, for example, a microprocessor, microcontroller or other control logic. In this example, processor 1504 is connected to a bus 1502 or other communication medium.

Computing system 1500 can also include a main memory 1508, such as random access memory (RAM) or other dynamic memory, for storing information and instructions to be executed by processor 1504. Main memory 1508 also may be used for storing temporary variables or other intermediate information during execution of instructions to be executed by processor 1504. Computing system 1500 may likewise include a read only memory (ROM) or other static storage device coupled to bus 1502 for storing static information and instructions for processor 1504.

The computing system 1500 may also include information storage system 1510, which may include, for example, a media drive 1512 and a removable storage interface 1520. The media drive 1512 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1518 may include, for example, a hard disk, floppy disk, magnetic tape, optical disk, CD or DVD, or other fixed or removable medium that is read by and written to by media drive 1512. As these examples illustrate, the storage media 1518 may include a computer-readable storage medium having stored therein particular computer software or data.

In alternative embodiments, information storage system 1510 may include other similar components for allowing computer programs or other instructions or data to be loaded into computing system 1500. Such components may include, for example, a removable storage unit 1522 and an interface 1520, such as a program cartridge and cartridge interface, a removable memory (for example, a flash memory or other removable memory module) and memory slot, and other removable storage units 1522 and interfaces 1520 that allow software and data to be transferred from the removable storage unit 1518 to computing system 1500.

Computing system 1500 can also include a communications interface 1524. Communications interface 1524 can be used to allow software and data to be transferred between computing system 1500 and external devices. Examples of communications interface 1524 can include a modem, a network interface (such as an Ethernet or other NIC card), a communications port (such as for example, a universal serial bus (USB) port), a PCMCIA slot and card, etc. Software and data transferred via communications interface 1524 are in the form of signals which can be electronic, electromagnetic, optical or other signals capable of being received by communications interface 1524. These signals are provided to communications interface 1524 via a channel 1528. This channel 1528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1508, storage device 1518, or storage unit 1522. These and other forms of computer-readable media may store one or more instructions for use by processor 1504, to cause the processor to perform specified operations. Such instructions, generally referred to as 'computer program code' (which may be grouped in the form of computer programs or other groupings), when executed, enable the computing system 1500 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1500 using, for example, a removable storage drive, drive 1512 or communications interface 1524. The control logic (in this example, software instructions or computer program code), when executed by the processor 1504, causes the processor 1504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A user equipment (UE) comprising:
a receiver configured to receive si-Windowlength information, wherein the si-Windowlength information is received in a system information (SI) type 1 message;
a processor configured to calculate a downlink (DL) subframe wherein a SI message starts, wherein the calculated DL subframe is based on a total number of DL subframes contained in a radio frame;
the processor further configured to calculate in the radio frame where the SI message starts, wherein the calculated radio frame is based on the total number of DL subframes contained in the radio frame; and
the receiver further configured to receive the SI message, in the calculated DL subframe of the calculated radio frame, during a period provided by the si-Windowlength information.

2. The UE of claim 1, wherein the UE determines a periodicity of the SI message.

3. The UE of claim 1, further comprising:
the processor further configured to determine the number of DL subframes contained in the radio frame based on radio frame configuration information.

4. A method performed by a user equipment (UE), the method comprising:
- receiving, by the UE, si-Windowlength information, wherein the si-Windowlength information is received in a system information (SI) type 1 message;
- calculating, by the UE, a downlink (DL) subframe wherein a SI message starts, wherein the calculated DL subframe is based on a total number of DL subframes contained in a radio frame;
- calculating, by the UE, in the radio frame where the SI message starts, wherein the calculated radio frame is based on the total number of DL subframes in the radio frame; and
- receiving by the UE the SI message, in the DL subframe of the calculated radio frame, during a period provided by the si-Windowlength information.

5. The method of claim 4, further comprising:
determining, by the UE, a periodicity of the SI message.

6. The method of claim 4, further comprising:
determining, by the UE, the number of DL subframes contained in the radio frame based on radio frame configuration information.

7. An integrated circuit, the integrated circuit comprising:
- circuitry configured to receive si-Windowlength information, wherein the si-Windowlength information is received in a system information (SI) type 1 message;
- circuitry configured to calculate a downlink (DL) subframe wherein a SI message starts, wherein the calculated DL subframe is based on a total number of DL subframes contained in a radio frame;
- the circuitry further configured to calculate in the radio frame where the SI message starts, wherein the calculated radio frame is based on the total number of DL subframes contained in the radio frame; and
- the circuitry further configured to receive the SI message, in the calculated DL subframe of the calculated radio frame, during a period provided by the si-Windowlength information.

8. The integrated circuit of claim 7, further comprising:
circuitry configured to determine a periodicity of the SI message.

9. The integrated circuit of claim 7, further comprising:
circuitry configured to determine the number of DL subframes contained in the radio frame based on radio frame configuration information.

10. An evolved node B (eNB) comprising:
- a processor configured to calculate a downlink (DL) subframe wherein a system information (SI) message starts, wherein the calculated DL subframe is based on a total number of DL subframes contained in a radio frame;
- the processor further configured to calculate in the radio frame where the SI message starts, wherein the calculated radio frame is based on the total number of DL subframes contained in the radio frame; and
- a transceiver configured to transmit, the SI message in the calculated DL subframe of the calculated radio frame, during a period provided by si-Windowlength information.

11. The eNB of claim 10, further comprising:
the processor further configured to determine a periodicity of the SI message.

12. The eNB of claim 10, further comprising:
the processor further configured to determine the number of DL subframes contained in the radio frame based on radio frame configuration information.

13. A method performed by an evolved node B (eNB), the method comprising:
- calculating a downlink (DL) subframe wherein a system information (SI) message starts, wherein the calculated DL subframe is based on a total number of DL subframes contained in a radio frame;
- calculating in the radio frame where the SI message starts, wherein the calculated radio frame is based on the total number of DL subframes contained in the radio frame; and
- transmitting the SI message, in the calculated DL subframe of the calculated radio frame, during a period provided by si-Windowlength information.

14. The method of claim 13, further comprising:
determining a periodicity of the SI message.

15. The method of claim 13, further comprising:
determining the number of DL subframes contained in the radio frame based on radio frame configuration information.

* * * * *